(12) United States Patent
Terrano et al.

(10) Patent No.: US 10,901,502 B2
(45) Date of Patent: Jan. 26, 2021

(54) REDUCING HEAD MOUNTED DISPLAY POWER CONSUMPTION AND HEAT GENERATION THROUGH PREDICTIVE RENDERING OF CONTENT

(71) Applicant: Facebook, Inc., Menlo Park, CA (US)

(72) Inventors: Mark Terrano, Redmond, WA (US); Ian Erkelens, Kirkland, WA (US); Kevin James MacKenzie, Sammamish, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/454,342

(22) Filed: Jun. 27, 2019

(65) Prior Publication Data
US 2020/0409457 A1   Dec. 31, 2020

(51) Int. Cl.
| | |
|---|---|
| *G06T 19/00* | (2011.01) |
| *G06F 3/01* | (2006.01) |
| *G02B 27/01* | (2006.01) |
| *G06F 3/0481* | (2013.01) |
| *G06N 20/00* | (2019.01) |

(52) U.S. Cl.
CPC ........... *G06F 3/013* (2013.01); *G02B 27/017* (2013.01); *G06F 3/04812* (2013.01); *G06T 19/006* (2013.01); *G02B 2027/014* (2013.01); *G02B 2027/0138* (2013.01); *G02B 2027/0178* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2012/0105473 | A1* | 5/2012 | Bar-Zeev | G06T 7/70 345/633 |
| 2015/0338915 | A1* | 11/2015 | Publicover | G06F 3/012 345/633 |
| 2017/0178408 | A1* | 6/2017 | Bavor, Jr. | G06T 19/006 |
| 2017/0285736 | A1* | 10/2017 | Young | G06F 3/011 |
| 2019/0171943 | A1* | 6/2019 | Pao | G06F 16/29 |
| 2019/0180144 | A1* | 6/2019 | Tsishkou | G05D 1/0214 |

* cited by examiner

*Primary Examiner* — Steven Z Elbinger
(74) *Attorney, Agent, or Firm* — Keller Jolley Preece

(57) ABSTRACT

Systems, methods, and non-transitory computer-readable media are disclosed for selectively rendering augmented reality content based on predictions regarding a user's ability to visually process the augmented reality content. For instance, the disclosed systems can identify eye tracking information for a user at an initial time. Moreover, the disclosed systems can predict a change in an ability of the user to visually process an augmented reality element at a future time based on the eye tracking information. Additionally, the disclosed systems can selectively render the augmented reality element at the future time based on the predicted change in the ability of the user to visually process the augmented reality element.

20 Claims, 20 Drawing Sheets

US 10,901,502 B2

REDUCING HEAD MOUNTED DISPLAY POWER CONSUMPTION AND HEAT GENERATION THROUGH PREDICTIVE RENDERING OF CONTENT

BACKGROUND

The present disclosure generally relates to augmented reality (AR) systems. Augmented reality systems and environments allow a user to directly or indirectly view a real world environment augmented by generated sensory input, which may be super-imposed on the real world environment. Sensory input can be any form of media, such as sound, video, graphics, etc. Because AR systems allow for users to continue to engage with their real world environments in addition to a generated one, users may have less tolerance for large AR devices, as opposed to a virtual reality (VR) system in which the user is typically immersed in a fully generated environment.

However, the reduced form factor of AR devices produces challenges for providing sufficient power and computation. For example, AR devices often sacrifice battery and computation power to minimize weight and heat generation, resulting in devices with short battery life and reduced AR capabilities. In addition, the heat generated by both the battery and processor may be uncomfortable to a user, especially since the reduced form factor has limited surface area over which to diffuse the generated heat.

These along with other problems and issues exist with regard to conventional digital graphics systems.

SUMMARY

Embodiments of the present disclosure provide benefits and/or solve one or more of the foregoing or other problems in the art with systems, non-transitory computer-readable media, and methods for selectively rendering augmented reality content based on predictions of when a user will be able to visually process the augmented reality content. For example, the disclosed system can reduce overall power consumption and/or heat generation in a head mounted display (HMD) by only rendering visual content when a user can sense or act on the visual content. In particular, the disclosed system can utilize eye tracking information to predict if a user will be focusing on (and/or looking at) an area that includes an augmented reality ("AR") element. To illustrate, if the system predicts that the user will shift focus away from an AR element, the system can predict the shift in focus and discontinue one or more rendering processes associated with the AR element in anticipation of the shift in focus. By avoiding unnecessary processing and display of the AR element, the disclosed system is able to reduce energy consumption and heat generation of an HMD and associated processing devices.

As disclosed in more detail below, the disclosed system uses a machine learning model to predict, based on eye tracking information at an initial time, a change in an ability of a user to visually process an augmented reality element at a future time. Based on the prediction, the disclosed system selectively renders (e.g., begins rendering or discontinues rendering) the augmented reality element at the future time or in anticipation of the future time.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
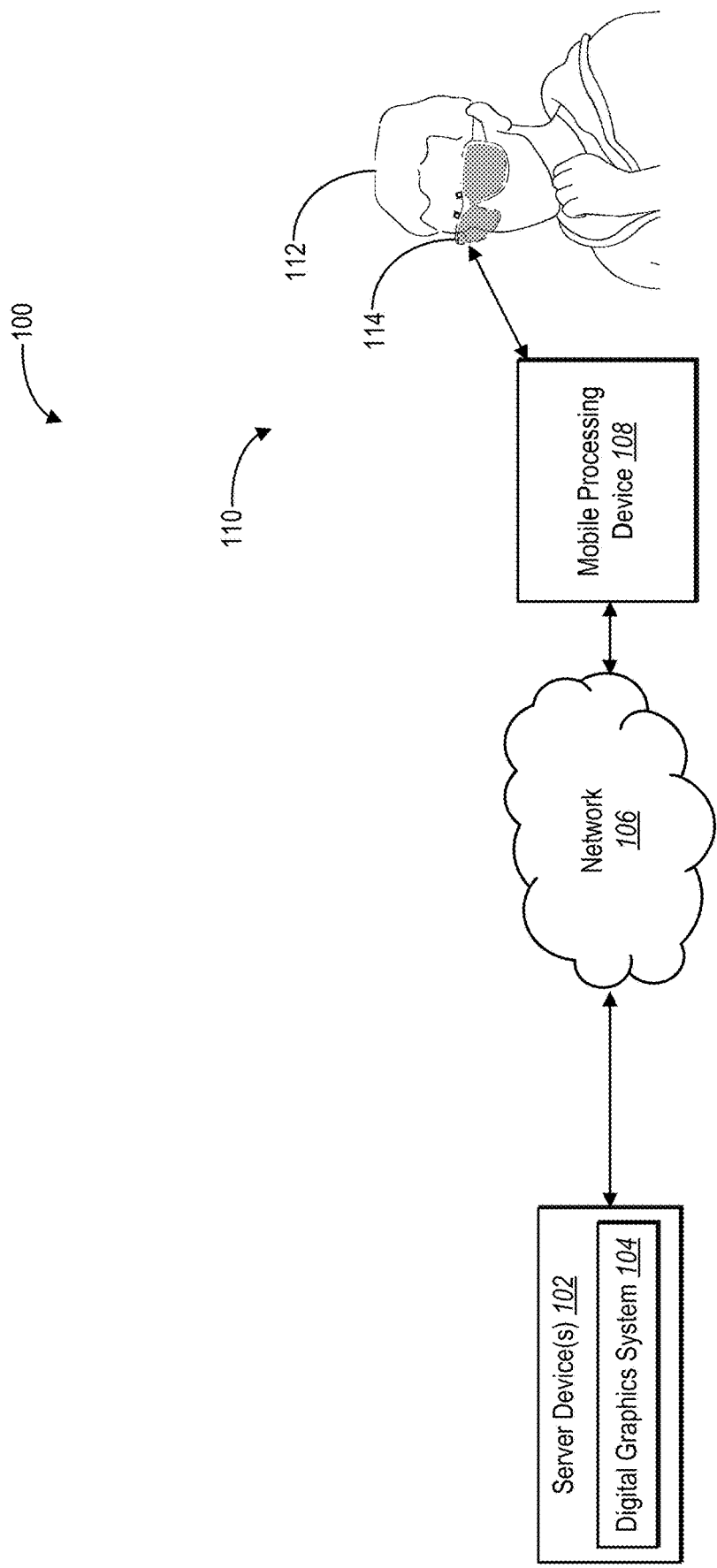
FIG. 1 illustrates a schematic diagram of an example environment in which an augmented reality system can operate in accordance with one or more embodiments.

One or more embodiments of the present disclosure includes an augmented reality system that selectively renders an AR element by way of a head mounted display based on predictions regarding a user's ability to visually process the AR element. In particular, the augmented reality system can utilize a machine learning model to predict a future viewpoint (e.g., gaze direction and/or focal point) of a user based on eye tracking information at an initial time. Moreover, the augmented reality system can utilize the future viewpoint to predict a change in the user's ability to visually process an AR element available for display by a head mounted display. The augmented reality system can then selectively render the AR element based on the prediction.

By selectively rendering the AR element based on the prediction, the augmented reality system can reduce power consumption and/or heat generation on a head mounted display.

As mentioned, the augmented reality system identifies eye tracking information for a user at an initial time and utilizes the eye tracking information to predict a change in an ability of the user to visually process an augmented reality element at a future time. For instance, the augmented reality system can utilize an eye tracking module on a head mounted display to track eye movement, eyelid movement, and/or head movement of the user. Moreover, the augmented reality system can utilize a machine learning model to predict, based on the eye tracking information, a change in the user's gaze direction and/or focal point, a blink, or a saccade movement of the user's eyes. Additionally, the augmented reality system can determine whether the user will be able to visually process an AR element at the future time based on such predictions.

Based on a predicted change in a user's ability to visually process an AR element at a future time, the augmented reality system can selectively render the AR element at the future time. As an example, based on a prediction that the user will become unable to visually process the AR element at the future time, the augmented reality system can terminate or pause rendering (e.g., displaying) the AR element at the future time in accordance with the predicted change. Similarly, based on a prediction that the user will become able to visually process the AR element at the future time, the augmented reality system can begin rendering (e.g., displaying) the AR element based on the predicted change.

The augmented reality system provides many advantages and benefits over conventional systems and methods. For example, the augmented reality system can improve energy and heat dissipation efficiencies of a head mounted display. For instance, by anticipating changes in a user's ability to perceive AR elements, even for brief moments (e.g., during a predicted blink and/or a predicted saccade eye movement), the augmented reality system is able to avoid unnecessarily rendering AR elements when the user is unable to visually process them. As a result, the features disclosed herein help preserve battery life and reduce heat generation on an HMD.

Additionally, the augmented reality system can also improve the efficiency of a mobile processing device and/or head mounted display that processes content (e.g., graphics) for the AR elements. For instance, by reducing the amount of time AR elements are rendered while a user is predicted to be unable to visually process the AR elements, the augmented reality system utilizes less computational resources compared to some conventional systems. In particular, the augmented reality system can reduce the amount of time a mobile processing device and/or head mounted display utilizes a rendering pipeline (e.g., graphic calculations, physics calculations, SLAM processing) and/or sensors (e.g., GPS, camera sensors, accelerometers, gyroscopes), while a user is predicted to be unable to visually process the AR elements, to utilize less computational resources compared to some conventional systems.

As illustrated by the foregoing discussion, the present disclosure utilizes a variety of terms to describe features and advantages of the augmented reality system. Additional detail is now provided regarding the meaning of such terms. For example, as used herein, the term "head mounted display" refers to a wearable device capable of displaying digital content. In particular, the term "head mounted display" refers to a wearable device, that is positioned on a user's head, capable of displaying (or presenting) digital content such as graphics, images, video, sound, etc. For instance, a head mounted display can include a virtual reality headset, mixed reality headset, and/or augmented reality glasses.

As used herein, the term "augmented reality glasses" refer to a wearable device capable of superimposing (or displaying) digital content into a real-world view of a user. In particular, the term "augmented reality glasses" refers to a wearable device that includes transparent lenses that are capable of superimposing (or displaying) digital content (as augmented reality elements) into a real-world view and/or scene that is being observed by a user through the lenses.

Moreover, as used herein, the term "augmented reality element" (sometimes referred to as "augmented reality object") refers to visual content (2D and/or 3D) that is super-imposed (or displayed) by an HMD on a user's view of the real world. In particular, the term "augmented reality element" can include a graphical object, digital image, digital video, text, and/or graphical user interface displayed on (or within) lenses of an HMD. Indeed, an augmented reality element can include a graphical object (e.g., a 3D and/or 2D object) that is interactive, manipulatable, and/or configured to realistically interact within the environment (e.g., based on user interactions, lighting, shadows, etc.).

Furthermore, as used herein, the term "eye tracking information" refers to information corresponding to an action and/or movement that relates to eyes (e.g., eye tracking data). In particular, the term "eye tracking information" refers to information corresponding to an action and/or movement of a user that affects the position, state, and/or circumstances of the user's eyes. For instance, eye tracking information can include actions and/or movements of a user such as movement of one or both eyes of a user (i.e., eye movement), movements of the body of the user (i.e., body movement), movements of the head of the user (i.e., head movement), and/or movements of the eyelids of the user (i.e., eyelid movement) that change (or affect) the user ability to visually process their surroundings, whether real or virtual. Moreover, eye tracking information can include changes in the position of eyes and/or changes in the position of the user's body (e.g., head movement) that cause a change in the position of the eyes relative to the user's eye sockets, head, and/or body. Furthermore, the eye tracking information can include information such as, but not limited to, an eye movement vector, eye movement velocities, eye movement accelerations, head movement velocities, and/or user positional velocities. Moreover, the eye tracking information can be segmented into multiple components of eye movement corresponding to multiple elements of the eye (e.g., upper eye lid, lower eye lid, cornea, pupil). For example, the eye tracking information can include a current eye position, a current eye movement (e.g., represented as a movement vector), a current eye lid position, and a current eye lid movement. The disclosed system is able to utilize detected components of eye movement (a single component or a combination of components) to predict a likelihood of future eye movement. For example, the system can use one machine learning model trained to determine a likelihood of a future eye position/movement (e.g., with relation to potentially viewable content) based on a current eye position and/or a current eye movement vector. As another example, the system can use another machine learning model to determine a likelihood of future eye lid movement (e.g., relative to a pupil) based on a current eye lid position and/or a current eye lid movement. Accordingly, the system can analyze the effect of each component of eye movement, both individually and collectively, to determine a likelihood of future eye movement and corresponding effect on a user's ability to visually process content (e.g., an AR element). Furthermore, if a user becomes or is predicted to become unable to visually process an AR element (e.g., because the user looks away from the AR element or because the user blinks), the system can further utilize one or more machine learning models to predict a minimum amount of eye movement and/or time (e.g., a minimum eye or eye lid travel time) required before the user will become able to visually process the AR element again. As a result, the system is able to selectively render the AR element based on the predicted eye movement.

As used herein, the term "final eye movement" refers to a resulting change in a position and/or state of a user's eyes. In particular, the term "final eye movement" refers to a resulting change in a gazing direction, focal point, viewpoint, peripheral view, and/or field of view of a user's eyes.

Additionally, as used herein, the term "blink" refers to the action of shutting and opening eyes. Furthermore, as used herein, the term "saccade" (sometimes referred to as "saccade movement") refers to a rapid movement of eyes between two or more focal points.

Moreover, as used herein, the term "machine learning model" refers to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine learning model can include but is not limited to a neural network (e.g., a convolutional neural network and/or deep learning neural network), decision tree, association rule learning, inductive logic programming, support vector learning, Bayesian network, regression-based model, principal component analysis, and/or a combination thereof.

Furthermore, as used herein, the term "visually process" refers to the ability of a user to sense, focus upon, and/or see an object (or visual content). In particular, the term "visually process" refers to the ability of a user to sense and/or see an object (or visual content) based on a gazing direction, focal point, viewpoint, peripheral view, and/or field of view of a user. Furthermore, the term "visually process" can refer to the ability of a user to cognitively process visual content (e.g., the brain of a user is able to process the visual content). For example, the ability of a user to visually process an object can change based on the object coming in and/or out of focus or the user's field of view. Furthermore, the ability of a user to visually process an object can also change based on the user's eyes opening and/or shutting (e.g., a blink).

In addition, as used herein, the term "render" refers to the action of processing and displaying visual content (e.g., an AR element). In particular, the term "render" refers to the action of utilizing one or more computer graphics techniques to process (and/or display) an AR element. For example, rendering can include, but is not limited to the act of processing geometry for an AR element, color for the AR element, shaders for the AR element, physics for the AR element, and/or animations for the AR element. Moreover, rendering can include the action of displaying AR elements on a display medium of an HMD. Moreover, as used herein, the term "graphics pipeline" refers to one or more steps and/or processes involved in rendering visual content (pre-display, during display, and/or post-display). For example, a graphics pipeline can include steps such as, but not limited to, geometry based processing, coordinate system (or positional) based processing, physics based processing, and/or animation based processing.

As used herein, the term "rendering area" (sometimes referred to as "rendering volume") refers to a region of a head mounted display capable of rendering (e.g., displaying) visual content. For example, the term "rendering area" refers to a portion of a lens (of an HMD) that includes a display medium capable of displaying and/or presenting an augmented reality element.

Moreover, as used herein, the term "sensor" refers to a device and/or component that can identify a physical property. In particular, the term "sensor" refers to a device and/or component that can receive input from physical stimulus and identify one or more physical properties. For instance, a sensor can include a device and/or component that identifies a physical location, identifies (or measures) distance, identifies temperature, identifies sound, and/or scans (or identifies) objects. For example, a sensor can include a GPS component, a SLAM sensor, optical sensors (e.g., an optical distance sensor), a microphone, and/or a camera.

Additionally, as used herein, the term "frame rate" refers to a frequency at which single instances (e.g., frames) of visual content are updated. In particular, the term "frame rate" refers to a frequency (e.g., refresh rate) at which frames of an AR element are updated on a display medium. For example, a frame rate can include a refresh rate for a display medium per second (e.g., 60 hertz, 120 hertz, 144 hertz, etc.).

Furthermore, as used herein, the term "resolution" (sometimes referred to as "display resolution") refers to a quantification of a number of pixels displayed on a display medium. In particular, the term "resolution" refers to a number of pixels displayed on a display that corresponds to the quality of a displayed AR element. For instance, a resolution can be expressed in terms of the number of pixels (on the horizontal and vertical axis) of specific visual content or a display.

Turning now to the figures, FIG. 1 illustrates a schematic diagram of an environment 100 in which an augmented reality system 110 (which includes a mobile processing device 108 and an HMD 114) can operate. As illustrated in FIG. 1, the environment 100 can include server device(s) 102, a network 106, a mobile processing device 108, and the HMD 114. As further illustrated in FIG. 1, the server device(s) 102 and the augmented reality system 110 (which includes the mobile processing device 108 and the HMD 114) can communicate via the network 106.

As shown in FIG. 1, the server device(s) 102 can include a digital graphics system 104. The digital graphics system 104 can generate and/or obtain data for the augmented reality system 110. For instance, the digital graphics system 104 can utilize training data to train a machine learning model to predict a change in the ability of a user to visually process AR elements and/or predict a final eye movement at a future time based on eye tracking information from an initial time (described in greater detail in FIG. 10). In addition, the digital graphics system 104 can generate and/or obtain visual content (e.g., digital images and/or digital videos) as AR elements and/or other data for rendering (and/or processing) the AR elements. Furthermore, the server device(s) 102 can store data such as the training data, machine learning model data, visual content (for the one or more AR elements), and/or data for rendering (and/or processing) the AR elements.

Additionally, the digital graphics system 104 can provide information (and or data) to the augmented reality system 110 (via the server device(s) 102). For instance, the digital graphics system 104 can provide a trained machine learning model to the augmented reality system 110. Moreover, the digital graphics system 104 can provide AR elements and/or other data for rendering the AR elements to the augmented reality system 110. The server device(s) 102 can include a variety of computing devices, including those explained below with reference to FIG. 13.

For example, as shown in FIG. 1, the environment 100 can include the augmented reality system 110. The augmented reality system 110 can generate and/or provide visual content as AR elements to the HMD 114 (e.g., utilizing a graphics pipeline and/or other processes). Additionally, the augmented reality system 110 can utilize a machine learning model to predict a change in the ability of a user to visually process AR elements and/or predict a viewpoint of a user's eye at a future time based on eye tracking information in accordance with one or more embodiments herein. Moreover, the augmented reality system 110 can selectively render AR elements (e.g., display AR elements on the HMD 114) based on predictions from the machine learning model in accordance with one or more embodiments herein.

Additionally, as shown in FIG. 1, the augmented reality system 110 includes the mobile processing device 108 (e.g., a staging device). In particular, the mobile processing device 108 can be a client device. Moreover, the mobile processing device 108 can include, but is not limited to, a mobile graphics processing device, a mobile device (e.g., smartphone or tablet), a laptop, a desktop, including those explained below with reference to FIG. 13. Furthermore, in reference to FIG. 1, the mobile processing device 108 can include a device operated by a user 112. The mobile processing device 108 can receive eye tracking information (or other information) from the HMD 114. Additionally, the mobile processing device 108 can also include sensors (or other components) to identify eye tracking information. Moreover, the mobile processing device 108 can provide and/or instruct the HMD 114 to display one or more AR elements.

Moreover, as shown in FIG. 1, the augmented reality system 110 includes the HMD 114 (e.g., augmented reality glasses). As illustrated in FIG. 1, the HMD 114 is operated by the user 112 (e.g., the user 112 can wear the HMD 114). Moreover, the HMD 114 can communicate with the mobile processing device 108. For example, as mentioned above, the HMD 114 can provide eye tracking information to the mobile processing device 108. Furthermore, the HMD 114 can display AR elements and/or present other audio/visual content (e.g., as instructed by the augmented reality system 110).

Additionally, as shown in FIG. 1, the environment 100 includes the network 106. The network 106 can enable communication between components of the environment 100. In one or more embodiments, the network 106 may include the Internet or World Wide Web. Additionally, the network 106 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the mobile processing device 108, the HMD 114, and the network 106 may communicate using any communication platforms and technologies suitable for transporting data and/or communication signals, including any known communication technologies, devices, media, and protocols supportive of data communications.

Although FIG. 1 illustrates the server device(s) 102 and the mobile processing device 108 communicating via the network 106, the various components of the environment 100 can communicate and/or interact via other methods (e.g., the server device(s) 102 and the mobile processing device 108 can communicate directly). In addition, although FIG. 1 illustrates the mobile processing device 108 and the HMD 114 communicating directly, the HMD 114 and the various components of the environment 100 can also communicate and/or interact via other methods (e.g., the mobile processing device 108 and the HMD 114 communicate via the network 106).

Furthermore, the augmented reality system 110 can be implemented by a particular component and/or device within the environment 100. For instance, the augmented reality system 110 can be implemented, in whole or in part, by the server device(s) 102, the mobile processing device, and/or the HMD 114. Moreover, the description herein can refer to the augmented reality system 110 performing all of the steps for one or more embodiments disclosed herein. Indeed, the one or more embodiments disclosed herein can be performed by the augmented reality system 110 with any described component and/or in any arrangement (including those of the digital graphics system 104).

Figure 2:
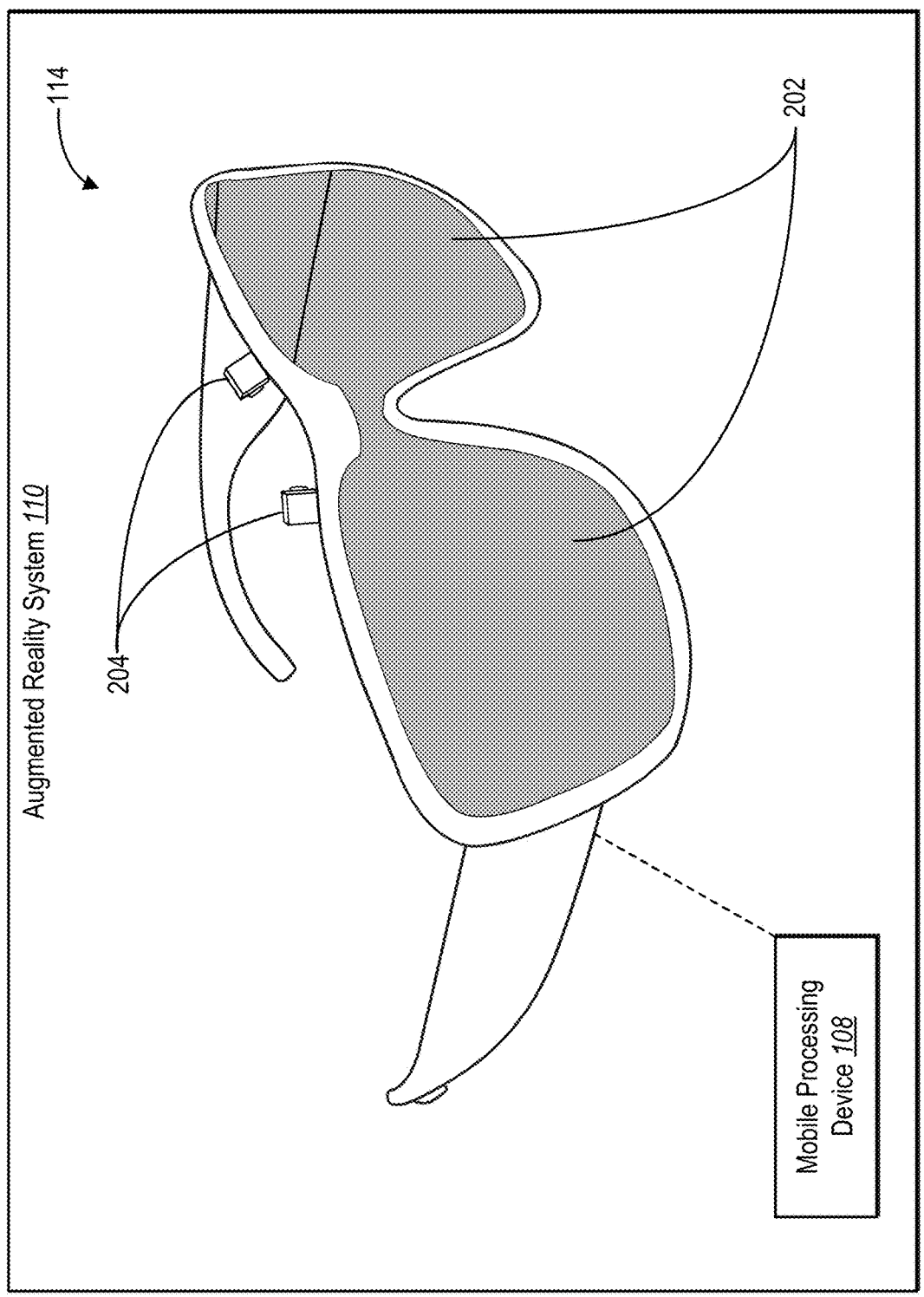
FIG. 2 illustrates an example head mounted display of an augmented reality system in accordance with one or more embodiments.

As mentioned above, the augmented reality system 110 can selectively render AR elements on an HMD. FIG. 2 illustrates components of the HMD 114. For instance, as shown in FIG. 2, the HMD 114 can include an electronic display 202 and an eye tracking module 204. Furthermore, although not shown in FIG. 2, the HMD 114 can include components to communicate with other components of the augmented reality system 110 (e.g., the mobile processing device 108).

In one or more embodiments, the augmented reality system 110 causes the HMD 114 to display AR elements on the electronic display 202. In particular, the electronic display 202 can include one or more transparent lenses that are capable of displaying AR elements via a transparent rendering area (or rendering volume). Indeed, the augmented reality system 110 can cause the electronic display 202 to enable a user to view a real-world environment via the one or more transparent lenses while also presenting (or displaying) AR elements to the user on the rendering area of the electronic display 202. Moreover, the augmented reality system 110 can cause the electronic display 202 to superimpose (via displaying) AR elements within a real-world environment that is being viewed by a user within a rendering area of the electronic display 202. Although FIG. 2 illustrates the electronic display 202 as a single electronic display, the electronic display 202 can include multiple electronic displays (e.g., on multiple lenses of the HMD 114). Furthermore, the electronic display 202 can include, but is not limited to, a liquid crystal display ("LCD"), an organic light emitting diode ("OLED") display, an active-matrix organic light-emitting diode display (AMOLED) display, and/or a projection module that projects AR elements on the electronic display 202 (or lenses).

Furthermore, as shown in FIG. 2, the HMD 114 include the eye tracking module 204. In one or more embodiments, the eye tracking module 204 include a variety of components to identify (or track) eye tracking information of a user that is wearing the HMD 114. For instance, the eye tracking module 204 can include cameras (e.g., internal cameras) to identify and/or track characteristics of a user's eyes as the eye tracking information (described in greater detail below). Furthermore, the eye tracking module 204 can include motion sensors (e.g., an inertial measurement unit, velocity sensors, directional sensors) and/or location sensors (e.g., GPS) to identify eye tracking information (e.g., a change in position due to body movement and/or a change in GPS location) as described in greater detail below).

Additionally, the HMD 114 can include one or more external sensors. For instance, the HMD 114 can include external cameras that capture (e.g., as a digital image and/or digital video stream) an environment of a user operating the HMD 114 (e.g., the user's surroundings and/or field of view). Furthermore, the HMD 114 can include external tracking sensors that capture simultaneous localization and mapping ("SLAM") information of the environment of the user operating the HMD 114.

Furthermore, the mobile processing device 108 can also include components to identify eye tracking information (e.g., a change in position due to body movement and/or a change in GPS location) and/or to track an environment of the user operating the HMD 114. For instance, the mobile processing device 108 can also include motion sensors (e.g., an inertial measurement unit, velocity sensors, directional sensors) and/or location sensors (e.g., GPS). Furthermore, the mobile processing device 108 can also include cameras to track the environment of the user and/or the HMD 114 (e.g., track movement of the HMD 114). Although one or more embodiments herein describe one or more components for identifying (or tracking) eye tracking information and/or the environment of a user, the HMD 114 and/or other components of the augmented reality system 110 can include a variety of components and/or sensors to identify eye tracking information and/or the environment of the user.

Figure 3:
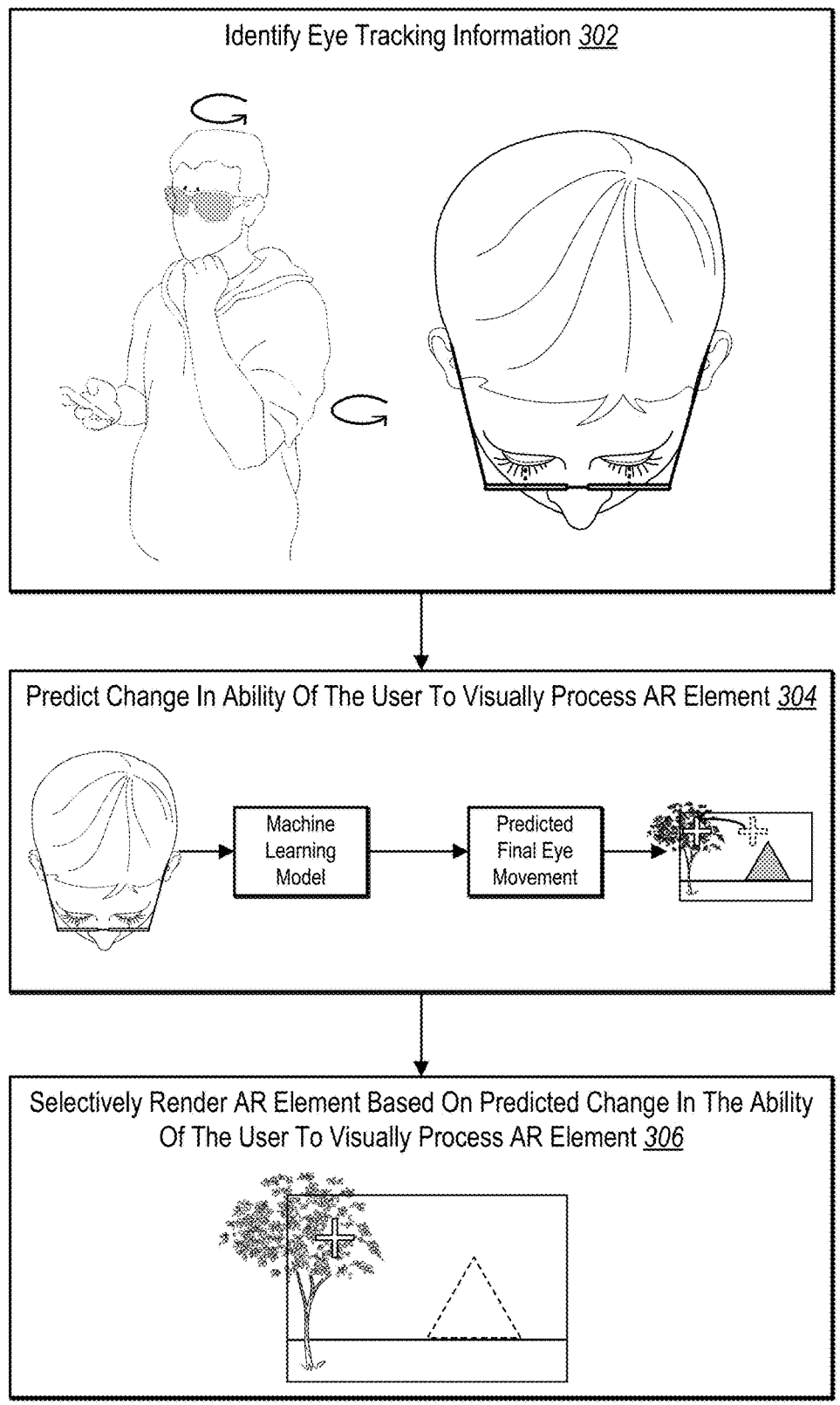
FIG. 3 illustrates an overview of an augmented reality system selectively rendering an augmented reality element in accordance with one or more embodiments.

As mentioned above, the augmented reality system 110 can selectively render an AR element within an HMD based on predicting whether a user is able to visually process the AR element. For example, FIG. 3 illustrates an overview of a sequence of acts that the augmented reality system 110 performs in relation to identifying eye tracking information, predicting a change in an ability of the user to visually process an AR element, and selectively rendering the AR element on an HMD based on such a prediction. As previously mentioned, the acts performed by the augmented reality system 110 can be implemented by a variety of components (e.g., the server device(s) 102, the mobile processing device 108, and/or the HMD 114).

For instance, as shown in FIG. 3, the augmented reality system 110 performs an act 302 of identifying eye tracking information. In particular, as previously mentioned, the augmented reality system 110 can identify eye tracking information of a user from an HMD operated by the user and/or from a mobile processing device. For instance, the identified eye tracking information can include information such as eye movement, eyelid movement, and/or head movement of the user at an initial time. Additional detail regarding the augmented reality system 110 identifying eye tracking information is described in greater detail in FIGS. 4A and 4B.

Furthermore, as illustrated in FIG. 3, the augmented reality system 110 performs an act 304 of predicting a change in an ability of the user to visually process an AR element (based on eye tracking information). For example, the augmented reality system 110 can apply (or input) eye tracking information from an initial time into a machine learning model to predict a final eye movement at a future time. Moreover, the augmented reality system 110 can determine whether the user will be able to visually process an AR element at the future time based on the predicted final eye movement (e.g., act 304 illustrates a predicted change a focal point of the user within a field of view of an HMD). Additional detail regarding the augmented reality system 110 predicting (and/or training a machine learning model to predict) an ability of a user to visually process an AR element is described in greater detail in FIGS. 5 and 10.

Moreover, as shown in FIG. 3, the augmented reality system 110 performs an act 306 of selectively rendering an AR element based on the predicted change in the ability of the user to visually process the AR element. For instance, the augmented reality system 110 can determine whether an AR element should be rendered at the future time based on predicting whether a user will be able to visually process the AR element at the future time. As an example, (in act 306) the augmented reality system 110 determines that a user will be unable to visually process the AR element (e.g., the displayed triangle) and terminates the display of the AR element within the field of view of the HMD. Additional detail regarding selectively rendering an AR element (and/or selectively processing other functions of the augmented reality system 110) based on the predicted change in the ability of the user to visually process the AR element is described in greater detail in FIGS. 6-9.

As mentioned above, the augmented reality system 110 can identify eye tracking information. Indeed, eye tracking information can include characteristics, actions, and/or positional changes of eyes that affect the view point (and/or gazing direction) of the eyes. In particular, as described above, the augmented reality system 110 can utilize various components of an HMD and/or a mobile processing device to identify eye tracking information. For example, FIGS. 4A and 4B illustrate the augmented reality system 110 identifying eye tracking information utilizing various components of an HMD and/or a mobile processing device.

Figure 4A:
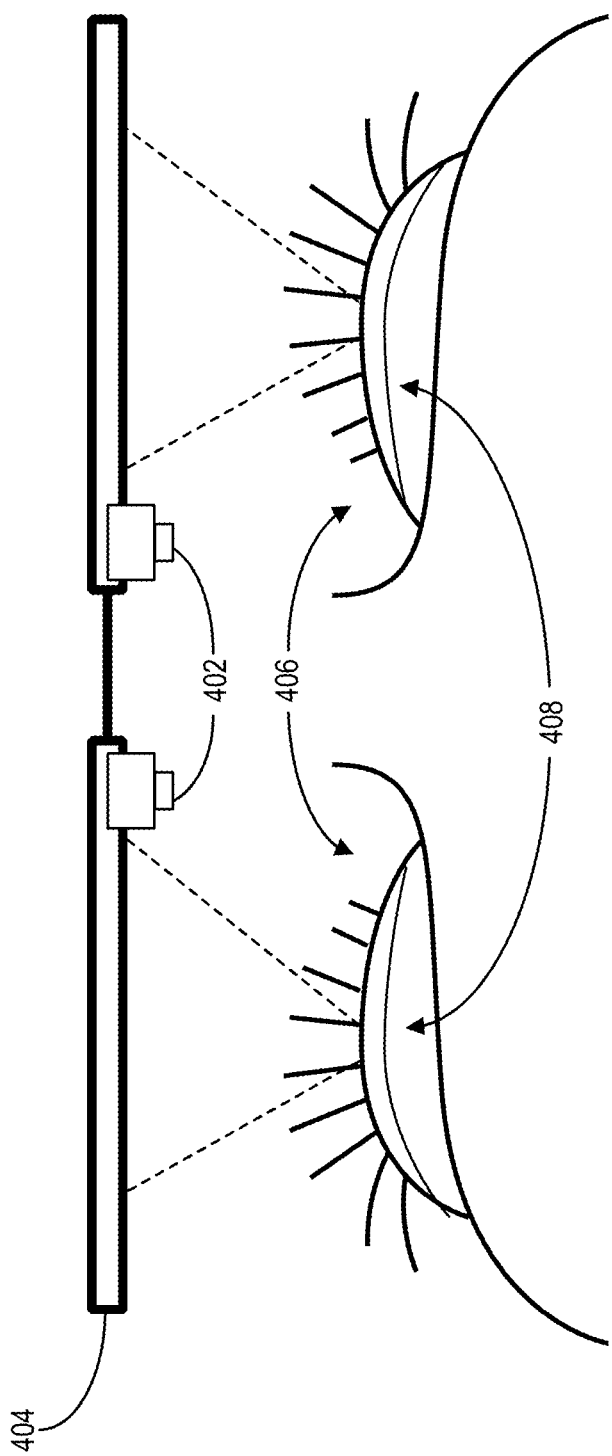
FIGS. 4A and 4B illustrate an augmented reality system identifying eye tracking information in accordance with one or more embodiments.
Figure 4B:
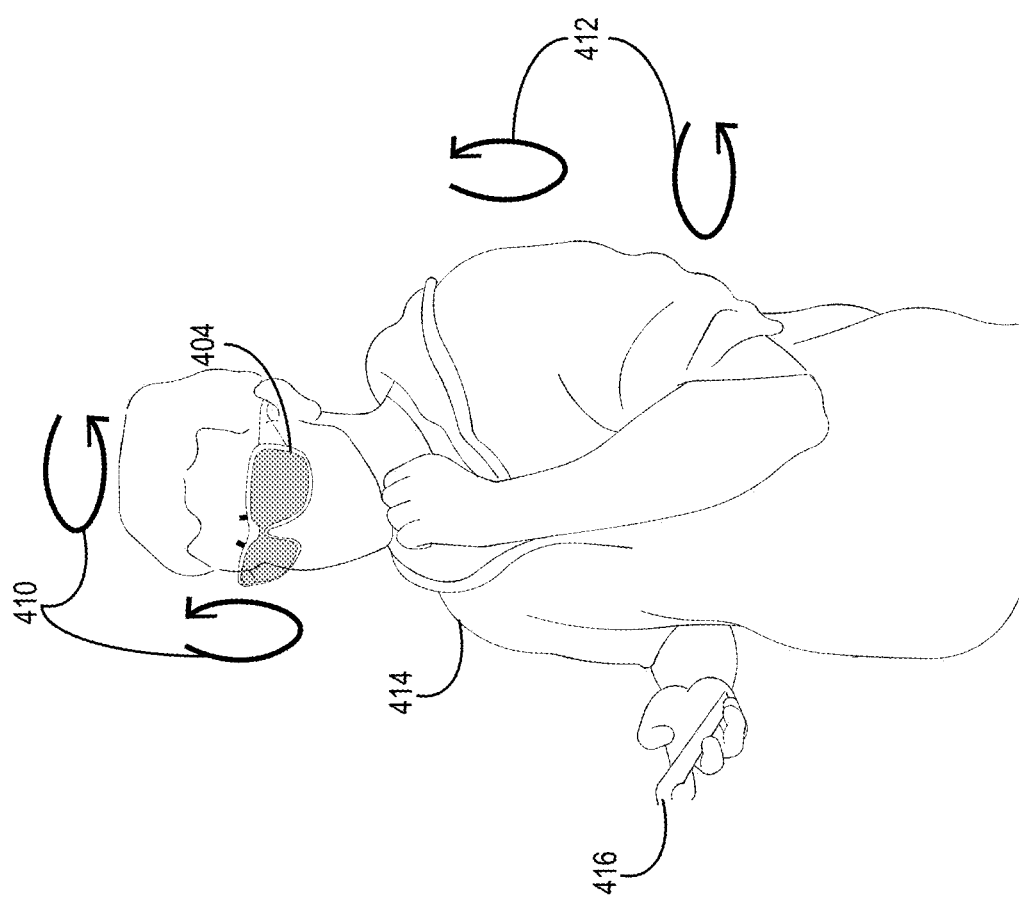

As previously mentioned, and as illustrated in FIG. 4A, the augmented reality system 110 can utilize an eye tracking module of an HMD to identify eye tracking information. For instance, as shown in FIG. 4A, the augmented reality system 110 can utilize an eye tracking module 402 of an HMD 404 to identify eye tracking information. In particular, as shown in FIG. 4A, the augmented reality system 110 can utilize the eye tracking module 402 to capture information regarding the eyes 406 (or eyeball geometry) of the user.

For example, the augmented reality system 110 can utilize the eye tracking module 402 to capture movement (or positional changes) of the eyes 406 (e.g., movement relative to the eye sockets of the eyes 406) as the eye tracking information. In particular, the augmented reality system 110 can identify eye movement vectors of the eyes 406 to identify (or map) the position of the eyes 406. In some embodiments, the augmented reality system 110 identifies the position (or positional changes) of the eyes 406 in three different axes (x-axis, y-axis, and z-axis). Moreover, in one or more embodiments, the augmented reality system 110 identifies movements of the eyes 406 such as, but not limited to, horizontal eye movements, vertical eye movements, parabolic eye movements, and/or torsional eye movements.

Furthermore, the augmented reality system 110 can utilize the eye tracking module 402 to identify characteristics associated with the movement of the eyes 406 as the eye tracking information. For example, in one or more embodiments, the augmented reality system 110 utilizes the eye tracking module 402 to identify a velocity associated with the movement of the eyes 406. Additionally, in some embodiments, the augmented reality system 110 utilizes the eye tracking module 402 to identify an acceleration associated with the movement of the eyes 406. Moreover, the augmented reality system 110 can utilize the eye tracking module 402 to identify time intervals between eye movements (e.g., time intervals between saccade movements, vergence shifts, and/or smooth pursuit movements of the eyes 406).

In addition, the augmented reality system 110 can utilize the eye tracking module 402 to identify visual capabilities of the eyes 406 as eye tracking information. For instance, the augmented reality system 110 can utilize the eye tracking module 402 to identify a peripheral vision zone of the eyes 406 in their current state (e.g., the area where there is a loss of visual acuity and/or a blind spot). Furthermore, the augmented reality system 110 can utilize the eye tracking module 402 to identify a response time (and/or reflex times) of the eyes 406 to certain stimuli (e.g., animation changes, depth of vision changes, color changes, brightness changes, etc.) in AR elements and/or the viewed environment. Moreover, the augmented reality system 110 can utilize the eye tracking module 402 to identify the amount of time the eyes 406 of a user focus on specific objects and/or remain in a specific focal point, viewpoint, and/or gazing direction (and/or viewing areas).

Additionally, the augmented reality system 110 can utilize the eye tracking module 402 to identify physical characteristics of the eyes 406. For example, the augmented reality system 110 can utilize the eye tracking module 402 to identify physical characteristics of parts of the eyes 406 such as, but not limited to, the pupils, cornea, sclera, fovea, and/or retina. For instance, the augmented reality system 110 can utilize the eye tracking module 402 to identify a pupil size, iris size, pupillary distance, foveal axis, pupillary axis for the eyes 406. Furthermore, the augmented reality system 110 can identify the optical power of the lenses of the HMD 404 (e.g., prescription lenses) and/or diopter of the lenses as part of the eye tracking information.

Moreover, the augmented reality system 110 can utilize the eye tracking module 402 to identify information regarding the vision of the eyes 406. For instance, the augmented reality system 110 can utilize the eye tracking module 402 to identify a depth of vision based on the position and/or other characteristics of the eyes 406. Additionally, the augmented reality system 110 can utilize the eye tracking module 402 to identify a vergence depth for the eyes 406.

In one or more embodiments, the augmented reality system 110 can utilize the eye tracking module 402 to identify a focal point, viewpoint, and/or gazing direction of the eyes 406. For example, in some embodiments, the augmented reality system 110 (or the eye tracking module 402) can utilize any of or any combination of information described above to identify a focal point, viewpoint, and/or gazing direction of the eyes 406 in relation to the lenses of the HMD 404 as the eye tracking information.

Furthermore, the augmented reality system 110 can utilize the eye tracking module 402 to identify other actions and/or characteristics as eye tracking information. For instance, the augmented reality system 110 can utilize the eye tracking module 402 to identify movements of the eyelids 408 of the eyes 406 (e.g., eyelid movements) as eye tracking information. In particular, the augmented reality system 110 can utilize the eye tracking module 402 to identify actions and/or characteristics such as, but not limited to, changes in the position of the eyelids 408, speed and/or acceleration of the eyelids 408, reflex (or response) times for the eyelids 408 in response to stimuli as eye tracking information. Moreover, the augmented reality system 110 can utilize the eye tracking module 402 to identify blinking patterns based on movements of the eyelids 408 (e.g., the amount of time between blinks, the duration of blinks, frequency of blinks, etc.) as eye tracking information.

In one or more embodiments, the eye tracking module 402 (and/or augmented reality system 110) includes one or more machine learning models that segment actions and/or movements of various elements of the eye to identify the eye tracking information. For example, the augmented reality system 110 can identify eye tracking information by utilizing a machine learning model to identify the current position of the user's eyes, current movement vectors of the user's eyes, and/or likely future movement of the user's eyes in relation to one or more AR elements. Additionally, the augmented reality system 110 can identify eye tracking information by utilizing a machine learning model to identify the current eye lid position (e.g., upper eye lid and/or bottom eye lid positions), current movement of the upper eye lid and/or lower eye lids, and/or likely future movement of the upper and/or lower eye lids in relation to the pupil (or other elements of the eyes). Furthermore, the augmented reality system 110 can include a machine learning model to identify the position, movement, and/or likely future movement of other elements of the eyes (e.g., pupil, cornea, etc.). Moreover, the eye tracking module 402 can include a machine learning model to interpret sensor information (e.g., from cameras and/or one or more sensors that tracking the user's eyes) and segment such information based on various eye elements (e.g., pupil movement, eye lid movement, eye movement, etc.) as the eye tracking information.

Additionally, the augmented reality system 110 can also identify other actions and/or movements of a user as eye tracking information (e.g., position changes of the eyes of the user due actions and/or movements of the user's body). For instance, FIG. 4B illustrates the augmented reality system 110 identifying other actions and/or movements of the user. As shown in FIG. 4B, the augmented reality system 110 can utilize sensors (or other components) of the HMD 404 and/or sensors (or other components) of the mobile processing device 416 (e.g., a smartphone) to identify head movements 410 and/or body movements 412 of a user 414 as eye tracking information. Indeed, the augmented reality system 110 can utilize identified head movements and/or body movements to identify a change in eye position (or the viewpoint of the eyes) of the user relative to the head and/or body as eye tracking information.

For example, in one or more embodiments, the augmented reality system 110 can identify head movements 410 and/or body movements 412 on three different axes (e.g., x-axis, y-axis, and z-axis). Indeed, augmented reality system 110 can identify horizontal and/or vertical movements for the head movements 410 and/or the body movements 412. Furthermore, the augmented reality system 110 can utilize sensors of the HMD 404 and/or the mobile processing device 416 to identify other characteristics for the head movements 410 and/or the body movements 412 (e.g., velocity and/or acceleration) as eye tracking information.

Furthermore, the augmented reality system 110 can identify a change in position of the user (e.g., a change in where the user is standing, a change in where the user is within an environment, etc.) as eye tracking information. In particular, the augmented reality system 110 can identify change in position of the user based on the identified body movement 412 and/or based on GPS information obtained by the mobile processing device 416 (and/or the HMD 404). Additionally, the augmented reality system 110 can determine a distance between a current position of the user and the coordinates (or position) at which an AR element is super-imposed within the field of view of the user (e.g., where the AR element is located within the real-world environment of the user). Furthermore, the augmented reality system 110 can also identify other characteristics regarding the change in position of the user (e.g., velocity and/or acceleration) as eye tracking information. Indeed, in one or more embodiments, the augmented reality system 110 can identify final eye movement of the user's eyes based on the change in position of the user.

Although FIGS. 4A and 4B and the disclosure above describe a variety of information that the augmented reality system 110 can identify as eye tracking information, the augmented reality system 110 can identify and/or utilize any other information (e.g., information provided by components of an HMD and/or a mobile processing device) that affect the ability of user to visually process objects as eye tracking information. For instance, the augmented reality system 110 can identify any information regarding changes and/or movements) of the position (and/or orientation) of the eyes of a user in relation to the user's eye sockets, the user's head, the user's body, and/or the positioning of the HMD as eye tracking information. Moreover, the augmented reality system 110 can identify a density of a scene (e.g., the number or size of AR elements within a rendering area and/or scene viewed by a user of an HMD).

As mentioned above, the augmented reality system 110 can identify other information that may affect the ability of the user to visually process objects. For instance, the augmented reality system 110 can identify (and/or utilize) user information that corresponds to characteristics of the user. In particular, the augmented reality system 110 can identify (and/or) utilize user information such as, but not limited to, gender, age, height, and/or eyeglasses prescription data as input information for a machine learning model to predict a change in an ability of a user to visually process an augmented reality element within an HMD. In one or more embodiments, the eye tracking information can be task specific (e.g., based on user activities such as, but not limited to, driving, working, playing a sport, playing a video game, watching a movie, etc.).

Figure 5:
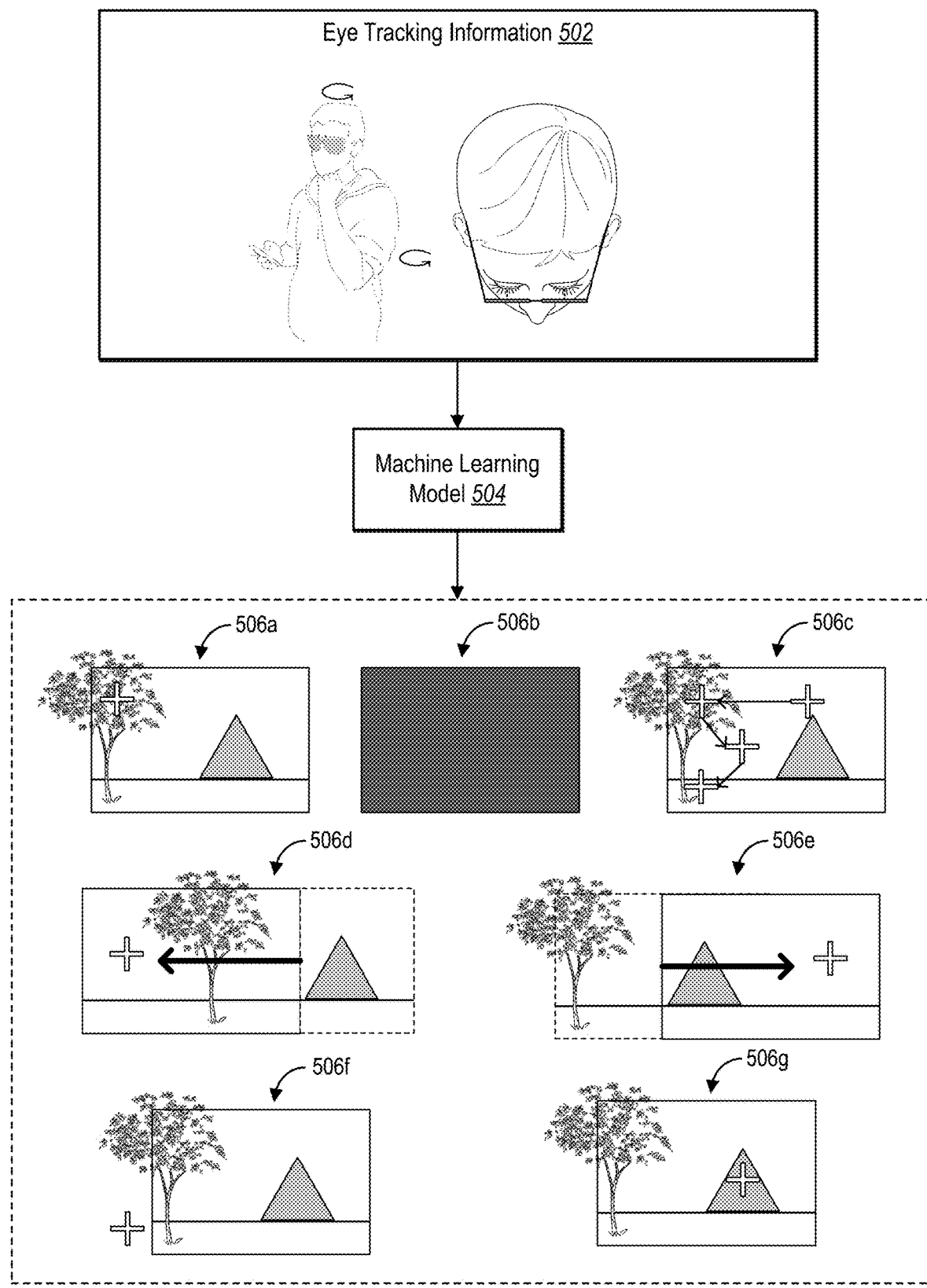
FIG. 5 illustrates an augmented reality system predicting a change in an ability of a user to visually process an augmented reality element in accordance with one or more embodiments.

As mentioned above, the augmented reality system 110 can predict a change in an ability of a user to visually process an augmented reality element within an HMD. For instance, FIG. 5 illustrates the augmented reality system 110 predicting (and/or detecting) a change in an ability of a user to visually process an augmented reality element with a variety of example predictions. In particular, as shown in FIG. 5, the augmented reality system 110 can input eye tracking information 502 (e.g., eye tracking information from an initial time identified as described above) into a machine learning model 504. Indeed, the machine learning model 504 can include a machine learning model as described and/or trained in FIG. 10 below. Furthermore, as illustrated in FIG. 5, the augmented reality system 110 can receive (from the machine learning model 504) predicted (and/or detected) final eye movement for a future time (e.g., predictions 506a-506g).

For example, as shown in FIG. 5, the augmented reality system 110 can utilize the machine learning model 504 to predict (and/or detect) a variety of final eye movements (e.g., represented as plus signs in FIG. 5) of a user's eyes (e.g., as eye positions, focal points, gazing directions, viewpoints, etc.) at a future time. In particular, the machine learning model 504 can utilize eye tracking information 502 to predict a subsequent eye movement of the user at the future time. Moreover, the augmented reality system 110 can utilize the predicted final eye movement at the future time to determine a change in the ability of the user to visually process an augmented reality element within an HMD.

As shown in FIG. 5, the augmented reality system 110 can utilize the machine learning model 504 to receive a prediction 506a. In particular, as illustrated in FIG. 5, the prediction 506a can indicate that the focal point, gazing direction, and/or viewpoint of the user's eyes (e.g., the plus sign) will be away from an AR element (e.g., the triangle) at the future time. Indeed, the augmented reality system 110 can utilize the prediction 506a to determine that the user will be unable to visually process the AR element at the future time. For instance, the augmented reality system 110 can also receive a prediction that indicates that the focal point, gazing direction, and/or viewpoint of the user's eyes will be outside a peripheral area of an AR element.

In particular, the augmented reality system 110 can determine that the user will be unable to visually process the AR element at the future time because the prediction 506a indicates that the final eye movement (e.g., the focal point, viewpoint, gazing direction, field of view, etc.) will be a threshold distance away from the AR element. Indeed, the augmented reality system 110 can configure the threshold distance to represent a distance at which a user is not likely to visually process the AR element. Moreover, the augmented reality system 110 can compare the threshold distance to the distance between the predicted final eye movement and the AR element to determine whether the user will be able to visually process the AR element (e.g., if the distance between the final eye movement and the AR element meets the threshold distance).

Furthermore, the augmented reality system 110 can also determine that the user will be unable to visually process the AR element at the future time based on one or more regions of a rendering area (and/or lenses of the HMD). For instance, the augmented reality system 110 can divide a rendering area into pieces (e.g., regions). Moreover, the augmented reality system 110 can determine that the user will be unable to visually process the AR element at the future time by determining that the final eye movement will be outside a region that includes the AR object in the rendering area.

Furthermore, as shown in FIG. 5, the augmented reality system 110 can utilize the machine learning model 504 to receive a prediction 506b. Specifically, as shown in FIG. 5, the prediction 506b can indicate that the user will be blinking (or shutting their eyes) at the future time (e.g., no focal point, viewpoint, gazing direction, and/or field of view for the user's eyes due to the eyelids being shut). Moreover, the augmented reality system 110 can also receive (from the machine learning model 504) predictions of the duration of the blink and/or frequency of blinking of the user. Indeed, the augmented reality system 110 can utilize the prediction 506b to determine that the user will be unable to visually process the AR element at the future time while the user blinks (e.g., because of an absence of vision for the user during the blink or eyes being shut).

Additionally, as illustrated in FIG. 5, the augmented reality system 110 can utilize the machine learning model 504 to receive a prediction 506c. In particular, as shown in FIG. 5, the prediction 506c can indicate that the user's eyes will be experiencing a saccade (or saccade movement). Furthermore, the prediction 506c can indicate (or detect) a beginning of a saccade movement. Indeed, the augmented reality system 110 can determine that the user will be unable to visually process the AR element at the future time during the saccade movement of the user's eyes. Moreover, the augmented reality system 110 can utilize the machine learning model 504 to receive predictions of the other types of movement of the user's eyes. For instance, the augmented reality system 110 can receive predictions such as vergence shifts and/or smooth pursuit movements of the user's eyes. Furthermore, the augmented reality system 110 can also receive predictions corresponding to one or more of a duration, speed, and/or direction of such eye movements (e.g., saccade movement, vergence shifts, and/or smooth pursuit movements).

As also shown in FIG. 5, the augmented reality system 110 can utilize the machine learning model 504 to receive a prediction 506d. For instance, as illustrated in FIG. 5, the prediction 506d can indicate that the user's field of view will change at the future time (e.g., due to a predicted head and/or body movement of the user). Indeed, in one or more embodiments, the augmented reality system 110 receives predictions (from the machine learning model 504) of head and/or body movements of the user based on eye tracking information such as movement of the eyes. Moreover, the augmented reality system 110 can utilize the prediction 506d to determine that the user will be unable to visually process the AR element at the future time (e.g., as a result of the AR element being outside of the field of view).

Furthermore, as illustrated in FIG. 5, the augmented reality system 110 can utilize the machine learning model 504 to receive a prediction 506e. For example, as shown in FIG. 5, the prediction 506e can indicate that the user's field of view will change at the future time towards the AR element. Indeed, the augmented reality system 110 can utilize the prediction 506e to determine that the user will become able to visually process the AR element at the future time (e.g., as a result of the AR element coming into the field of view).

Additionally, in some embodiments, the augmented reality system 110 receives predictions (from the machine learning model 504) corresponding to an amount of time (e.g., a speed) for the change in the field of view of the user (outwards and/or towards the AR element). Moreover, the augmented reality system 110 can receive predictions (from the machine learning model 504) corresponding to the duration of time the user will remain in a specific field of view. Furthermore, the augmented reality system 110 can utilize such predictions to determine whether the user will be able to visually process the AR element at the future time.

As also illustrated in FIG. 5, the augmented reality system 110 can utilize the machine learning model 504 to receive a prediction 506f. In particular, as shown in FIG. 5, the prediction 506f can indicate that the focal point, gazing direction, and/or viewpoint of the user's eyes will be outside of a rendering area of the HMD. Indeed, the augmented reality system 110 can utilize the prediction 506f to determine that the user will be unable to visually process the AR element at the future time (e.g., the user is not looking at the rendering area of the HMD). Moreover, the augmented reality system 110 can also receive predictions (from the machine learning model 504) corresponding to the duration of time the focal point, gazing direction, and/or viewpoint of the user's eyes will remain outside the rendering area.

Furthermore, as illustrated in FIG. 5, the augmented reality system 110 can utilize the machine learning model 504 to receive a prediction 506g. Specifically, as shown in FIG. 5, the prediction 506g can indicate that the focal point, gazing direction, and/or viewpoint of the user's eyes will be near (and/or focusing on) the AR element. Furthermore, the augmented reality system 110 can utilize the prediction 506g to determine that the user will become able to visually process the AR element at the future time. Indeed, the augmented reality system 110 can determine that the user will become able to visually process the AR element based on comparing a distance between the focal point, gazing direction, and/or viewpoint of the user's eyes and the AR element with a threshold distance (as previously described). Moreover, the augmented reality system 110 can also receive predictions (from the machine learning model 504) corresponding to the duration of time that the focal point, gazing direction, and/or viewpoint of the user's eyes will be near the AR element (e.g., how long the user will focus on the AR element).

In one or more embodiments, the augmented reality system 110 receives (from a machine learning model) confidence scores for one or more predictions based on the input eye tracking information. In particular, the augmented reality system 110 can utilize the machine learning model to determine confidence scores (and/or probability scores) for a variety of predictions (e.g., the predictions described herein). Moreover, the augmented reality system 110 can utilize the confidence scores associated with the one or more predictions to select a predicted final eye movement (and/or the predicted change in an ability of the user to visually process an AR element) at the future time. For instance, in one or more embodiments, the augmented reality system 110 compares the confidence scores to a threshold confidence score to select a predicted final eye movement.

Furthermore, as described in relation to FIG. 5 above, the augmented reality system 110 can determine an ability of a user to visually process an AR element based on a prediction from a machine learning model utilizing various approaches (e.g., the predicted final eye movement at the future time). For instance, as mentioned above, the augmented reality system 110 can compare a threshold distance to a distance between a predicted final eye movement and a position of an AR element to determine a change in an ability of the user to visually process an AR element. Furthermore, the augmented reality system 110 can determine the ability of the user to visually process the AR element based on a distance between the predicted position of the user and the location of the AR element (in the real-world environment). Moreover, the augmented reality system 110 can utilize a prediction (in accordance with one or more embodiments herein) to determine a duration of time associated with the ability of the user to visually process an AR element (e.g., the amount of time the user can or cannot visually process the AR element).

Moreover, the augmented reality system 110 can determine an ability of a user to visually process an AR element based on a prediction from a machine learning model and/or characteristics of the AR element. For example, the augmented reality system 110 can determine the ability of the user to visually process the AR element based on a size of the AR element. Indeed, the augmented reality system 110 can utilize any number of characteristics of the AR element (e.g., colors, shape, etc.).

Moreover, the augmented reality system 110 can utilize any number of machine learning models to predict a final eye movement (and/or ability of a user to visually process an AR element). For instance, the augmented reality system 110 can utilize separate machine learning models to predict movements related to the position of the eye (as described above), predict movements of the eye lids (as described above), and/or to estimate minimum travel times of any of the eye parts (e.g., the eye lids, pupils, cornea, etc.) in relation to the ability of the user to visually process an AR element. Additionally, the augmented reality system 110 can utilize such separate identifications of actions and/or movements (as described above) as eye tracking information to predict, with a machine learning model (e.g., machine learning model 504), each eye element's individual and/or collective movement in relation to an AR element to predict the final eye movement (and/or ability of a user to visually process an AR element).

Furthermore, although FIG. 5 shows some examples of predicted final eye movements (e.g., to predict a change in an ability of a user to visually process an AR element), the augmented reality system 110 can utilize a machine learning model to receive any variety of predictions regarding an ability of a user to visually process an AR element. For instance, the augmented reality system 110 can utilize the machine learning model to receive predictions regarding a change in the position of the user (e.g., changes due to the user walking) that affect the ability of the user to visually process an AR element. Furthermore, the augmented reality system 110 can utilize the machine learning model to receive predictions regarding time (e.g., the amount of time it will take a user to look towards an AR element and/or the amount of time it will take the user to walk to the AR element). Moreover, the augmented reality system 110 can utilize the machine learning model to receive any combination of predictions in accordance with one or more embodiments herein.

Figure 6:
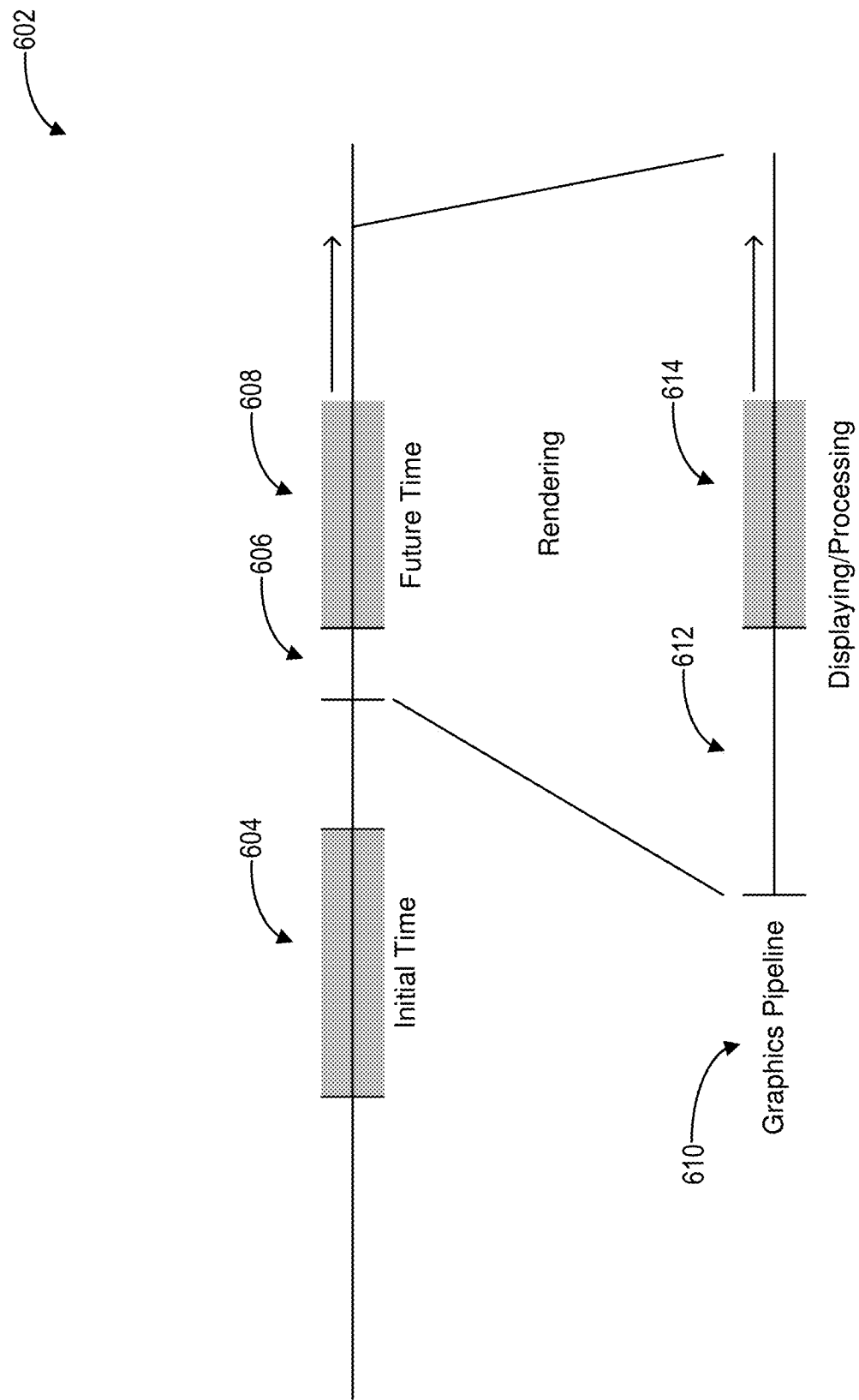
FIG. 6 illustrates a timeline of an augmented reality system utilizing a graphics pipeline in order to selectively render an augmented reality element in accordance with one or more embodiments.

As mentioned above, the augmented reality system 110 can selectively render an AR element based on a prediction of a change in an ability of the user to visually process the AR element. For example, FIG. 6 illustrates a timeline 602 of the augmented reality system 110 selectively rendering AR elements based on one or more predictions (e.g., one or more predictions in accordance with one or more embodiments herein). In particular, the augmented reality system 110 can identify eye tracking information (in accordance with one or more embodiments herein) at an initial time 604. Furthermore, the augmented reality system 110 can utilize the identified eye tracking information with a machine learning model to predict a change in an ability of the user to visually process an AR element in accordance with one or more embodiments for a future time 608. Indeed, the initial time 604 and the future time 608 can refer to any duration and/or point in time.

Furthermore, in reference to FIG. 6, the augmented reality system 110 can selectively render an AR element at the future time 608 based on a prediction that is made during the initial time 604 for the future time 608. For instance, as illustrated in FIG. 6, the augmented reality system 110 can utilize a graphics pipeline 610 to selectively render an AR element based on the prediction (from the initial time 604). For instance, the augmented reality system 110 can selectively utilize one or more processes within the graphics pipeline 610 to selectively render an AR element at the future time.

As also shown in FIG. 6, the augmented reality system 110 can utilize (and/or initiate) the graphics pipeline 610 (to selectively render an AR element) at a buffer time 606 before the future time 608 (e.g., in anticipation of the user being able to and/or unable to visually process an AR element at the future time 608). In particular, the augmented reality system 110 can selectively utilize one or more processes of the graphics pipeline during a buffer time 612 which corresponds with the buffer time 606 to selectively render an AR element (e.g., display and/or terminate displaying the AR element). For instance, the augmented reality system 110 can selectively utilize one or more processes of the graphics pipeline during a buffer time 612 to provide a smooth transition for an AR element from the perspective of the user and/or to prepare the display of the AR element for the future time 608.

As an example, in reference to FIG. 6, if the augmented reality system 110 determines (via a prediction in accordance with one or more embodiments herein) that the user will be unable to visually process an AR element at the future time 608 (corresponding to a future time 614), then the augmented reality system 110 can terminate (or disable) one or more processes (in the graphics pipeline 610) for rendering the AR element and/or terminate (or discontinue) the display of the AR element within an HMD at the future time 608. Moreover, the augmented reality system 110 can continue to not render (e.g., sleep and/or idle) the one or more processes of the graphics pipeline (e.g., suspend the display) for the AR element until another event (e.g., another prediction and/or an end of a duration of time associated with the current prediction in ability of the user to visually process an AR element) is determined at a subsequent time after the future time 608.

Furthermore, in reference to FIG. 6, if the augmented reality system 110 determines (via a prediction in accordance with one or more embodiments herein) that the user will become able to visually process an AR element at the future time 608 (corresponding to the future time 614), then the augmented reality system 110 can utilize one or more processes (in the graphics pipeline 610) for rendering the AR element and/or display the AR element within the HMD at the future time 608 (and/or the buffer time 606). Moreover, as mentioned above, the augmented reality system 110 can continue to render (or utilize) the one or more processes of the graphics pipeline for the AR element until another event (e.g., another prediction and/or an end of a duration of time associated with the current prediction in ability of the user to visually process an AR element) is determined at a subsequent time after the future time 608.

In particular, the augmented reality system 110 can selectively render an AR element by enabling, disabling, and/or modifying a variety of processes (and/or calculations) within a graphics pipeline for the AR element. Indeed, as an example, the augmented reality system 110 can modify a process by reducing and/or increasing the frequency at which the process is updated (and/or calculated). Moreover, the augmented reality system 110 can selectively render an AR element by modifying (e.g., reducing and/or increasing) a frame rate of the AR element and/or resolution of the AR element. Furthermore, the one or more processes within the graphics pipeline can include any variety of processes for rendering (e.g., initializing, loading, and/or displaying) the AR element within an HMD. For instance, the graphics pipeline can include processes such as, but not limited to, displaying the AR element, geometry (and/or vertex) based processes for the AR element, positional and/or spatial based processes for the AR element, physics based processing for the AR element, and/or animation based processing for the AR element.

For instance, the augmented reality system 110 can selectively render an AR element by enabling, disabling, and/or modifying a display of an AR element. Indeed, the augmented reality system 110 can display the AR element and/or terminate (or stop) displaying the AR element on an electronic display of an HMD. Furthermore, although one or more embodiments herein disclose selectively rendering a single AR element, the augmented reality system 110 can selectively render any number of AR elements in any number of locations within an HMD in accordance with one or more embodiments herein.

Furthermore, as an example, the augmented reality system 110 can enable, disable, and/or modify a variety of processes (and/or calculations) associated with the geometry of an AR element (e.g., geometry based processes). In particular, the augmented reality system 110 can enable, disable, and/or modify processes that determine the vertices of an AR element. Moreover, as an example, the augmented reality system 110 can enable, disable, and/or modify shaders for an AR element. In addition, the augmented reality system 110 can enable, disable, and/or modify lighting processes for an AR element.

Additionally, the augmented reality system 110 can enable, disable, and/or modify a variety of processes (and/or calculations) associated with the positional and/or spatial properties of an AR element (e.g., positional and/or spatial based processes). In particular, the augmented reality system 110 can enable, disable, and/or modify processes that determine location of the AR element within an electronic display of an HMD and/or a real-world environment (e.g., based on a coordinate system). Moreover, the augmented reality system 110 can enable, disable, and/or modify processes that determine transformation and/or distortion properties of the AR element within the electronic display of the HMD and/or the real-world environment.

Furthermore, the augmented reality system 110 can enable, disable, and/or modify a variety of processes (and/or calculations) associated with the physics associated with an AR element (e.g., physics based processing for the AR element). For instance, the augmented reality system 110 can enable, disable, and/or modify processes of a physics engine for the AR element. In particular, the physics engine can include processes that manage physical properties associated with the AR element (e.g., gravity, friction, rigid body movements, etc.).

Moreover, the augmented reality system 110 can enable, disable, and/or modify a variety of processes associated with animations of the AR element (e.g., animation based processing for the AR element). For example, the augmented reality system 110 can enable, disable, and/or modify processes that manage animations for an AR element. Specifically, the animations can include movements of the AR element and/or actions of the AR element.

Furthermore, the augmented reality system 110 can enable, disable, and/or modify a variety of graphical user interfaces (presented as AR elements). For instance, the augmented reality system 110 can enable, disable, and/or modify graphical user interfaces (presented as AR elements) by pausing updates to information within graphical user interfaces.

Although not shown in FIG. 6, the augmented reality system 110 can also selectively enable, disable, and/or manage other processes, calculations, and/or sensors of augmented reality glasses and/or a mobile processing unit. Indeed, the augmented reality system 110 can selectively enable, disable, and/or manage one or more processes and/or sensors based on one or more predictions (predictions identified in accordance with one or more embodiments herein). For example, the augmented reality system 110 can selectively enable, disable, and/or manage sensors such as cameras, SLAM processes, GPS, and/or the eye tracking module.

For instance, upon predicting that a user will not move (e.g., remain stationary) for a duration of time (e.g., utilizing eye tracking information and a machine learning model in accordance with one or more embodiments herein), the augmented reality system 110 can disable SLAM sensors and/or reduce the amount of information the SLAM sensors collect during the duration of time corresponding to the prediction (e.g., while the user is predicted to not move or does not move). Similarly, the augmented reality system 110 can selectively enable, disable, and/or manage other sensors such as the cameras of an HMD, an eye tracking module of the HMD, and/or GPS. For instance, upon predicting that a user will not be in range of an AR element (e.g., a position that is within a threshold range of the AR element), the augmented reality system 110 can reduce (and/or disable) tracking of GPS position until the user is predicted to be within range of the AR element. Moreover, upon predicting that a user will be unable to visually process an AR element for a duration of time, the augmented reality system 110 can reduce (and/or disable) the tracking of eye tracking information (e.g., reduce utilization of and/or disable sensors and/or an eye tracking module) for such a duration of time. Moreover, based on one or more predictions described above, the augmented reality system 110 can reduce and/or increase a sample rate of one or more cameras of the augmented reality system 110.

Moreover, the augmented reality system 110 can selectively enable, disable, and/or manage other processes, calculations, and/or sensors of an HMD and/or a mobile processing unit based on predicting (or determining) that a user will be focusing on a non-reactive AR element. For instance, upon predicting that the focal point, gazing direction, and/or viewpoint of the user's eyes will remain focused on the non-reactive AR element (e.g., an AR element that has no interactive features), the augmented reality system 110 can disable and/or reduce processes, calculations, and/or sensors of an HMD and/or a mobile processing unit. In particular, the augmented reality system 110 can disable and/or reduce processes corresponding to an eye tracking module when the focal point, gazing direction, and/or viewpoint of the user's eyes is predicted to remain focused on the non-reactive AR element.

In some embodiments, the augmented reality system 110 selectively renders the AR element at the future time based on a prediction (as described above) and based on a rendering time. In particular, the augmented reality system 110 can determine an amount of time it will take to render (e.g., initialize one or more processes in a graphics pipeline) to display an AR element (e.g., rendering time). Moreover, the augmented reality system 110 can selectively renders the AR element at the future time based on a prediction (as described above) and such a determined rendering time.

Furthermore, in one or more embodiments, the augmented reality system 110 selectively renders the AR element at the future time based on a prediction (as described above) by processing larger updates (or tasks) of the graphics pipeline. For instance, the augmented reality system 110 can process larger updates (or tasks) of the graphics pipeline during a predicted time in which a user will be unable to visually process an AR element (or updates to the AR element).

Figure 7:
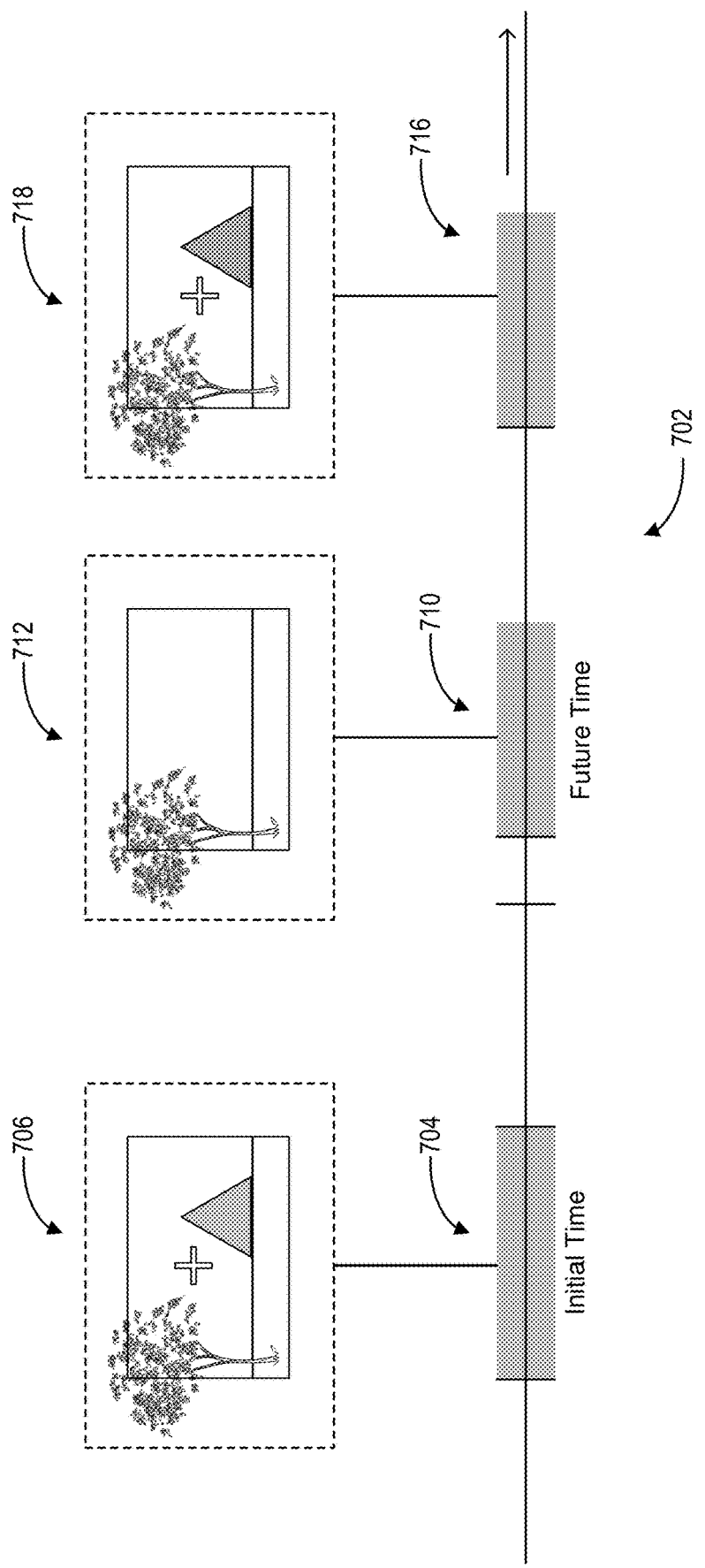
FIG. 7 illustrates a timeline of an augmented reality system selectively rendering an augmented reality element in accordance with one or more embodiments.

As previously mentioned, the augmented reality system 110 can selectively render an AR element at a future time based on a prediction of a change in an ability of the user to visually process the AR element from an initial time. As an example, FIG. 7 illustrates a timeline 702 of the augmented reality system 110 selectively rendering an AR element at a future time 710 based on a prediction an initial time 704 (in accordance with one or more embodiments herein). Furthermore, FIG. 7 illustrates (within the timeline 702) the augmented reality system 110 selectively rendering the AR element at a subsequent time 716 after the future time 710 based on another prediction (during the future time 710).

In particular, in reference to FIG. 7, the augmented reality system 110 renders an AR element within a viewing area of an HMD when the final eye movement (e.g., the focal point, gazing direction, and/or viewpoint of a user) is near the AR element (e.g., instance 706) at the initial time 704. Moreover, at the initial time 704, the augmented reality system 110 utilizes eye tracking information to predict that the user will be unable to visually process the AR element at the future time 710 (e.g., due to a predicted blink, saccade movement, change in a focal point, gazing direction, and/or viewpoint of the user's eyes). Furthermore, at the future time 710, the augmented reality system 110 terminates the display of the AR element (e.g., instance 712) based on the prediction for the entirety of the future time 710 and/or a partial duration of the future time 710.

Furthermore, at the future time 710, the augmented reality system 110 utilizes additional eye tracking information (e.g., identified at the future time 710) to predict that the user will become able to visually process the AR element at the subsequent time 716. Indeed, as shown in FIG. 7, the augmented reality system 110 renders the AR element (e.g., instance 718) at the subsequent time 716 based on the prediction from the future time 710. As shown in FIG. 7, the augmented reality system 110 can continuously identify eye tracking information of the user, predict a change in the ability of the user to visually process one or more AR elements, and selectively render the one or more AR elements based on such predictions.

Figure 8:
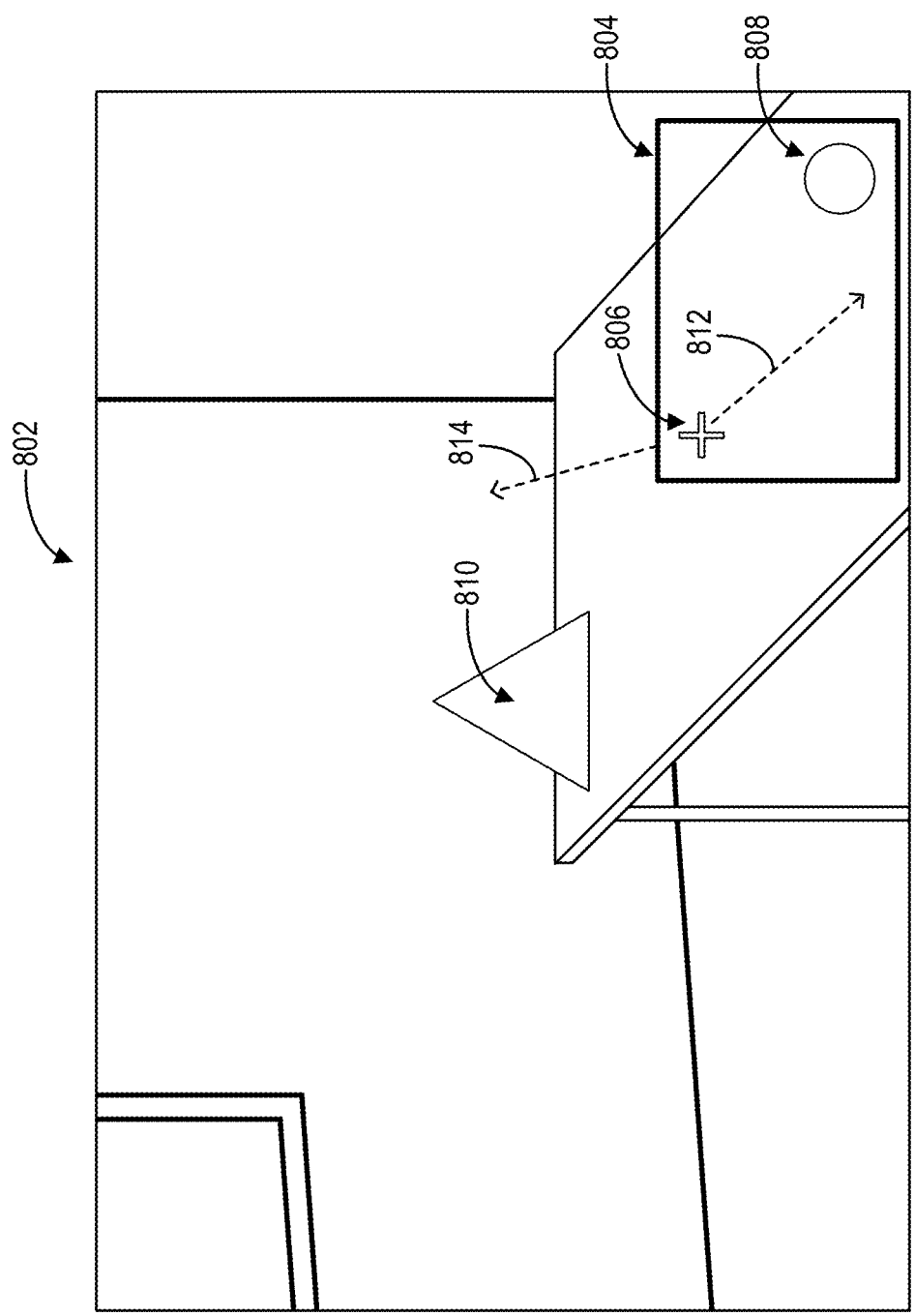
FIG. 8 illustrates an example of an augmented reality system operating in an environmental scene in accordance with one or more embodiments.

As mentioned above, the augmented reality system 110 can selectively render one or more AR elements based on predictions within a real-world environment on an HMD. For instance, FIG. 8 illustrates an example environment in which the augmented reality system 110 can selectively render one or more AR elements in accordance with one or more embodiments herein. For instance, FIG. 8 illustrates an environment 802 (e.g., an indoor office room) in which a user that is operating an HMD is situated. Moreover, as shown in FIG. 8, two AR elements are located (and can be rendered) within the environment 802 (e.g., a first AR element 808 and a second AR element 810). Furthermore, as shown in FIG. 8, the HMD have a fixed size viewing area 804 (e.g., the lenses of the HMD and/or rendering area). Furthermore, as shown in FIG. 8, the eye target 806 represents focal point, gazing direction, and/or viewpoint of the user's eye (which can include a determined horizontal, vertical, and depth from an eye tracking module).

In particular, in reference to FIG. 8, while the eye target 806 is a threshold distance away from the first AR element 808, the augmented reality system 110 can disable (or terminate) the rendering of the first AR element 808. Moreover, in reference to FIG. 8, upon predicting that the user's eyes will move towards the first AR element 808 (e.g., the eye target 806 will travel in a first trajectory 812), the augmented reality system 110 can render (or display) the first AR element 808.

Moreover, in reference to FIG. 8, the augmented reality system 110 can determine that the user cannot visually process the second AR element 810 while the eye target 806 (and/or the viewing area 804) are in the illustrated position. Furthermore, based on this determination, the augmented reality system 110 can disable the rendering of the second AR element 810. Additionally, in reference to FIG. 8, upon predicting that the user's eyes (and/or head) will move towards the second AR element 810 (e.g., the eye target 806 will travel in a second trajectory 814 to change the field of view within the viewing area 804), the augmented reality system 110 can render (or display) the second AR element 810.

In one or more embodiments, the augmented reality system 110 can selectively render multiple AR elements in a viewing area of an HMD based on a predicted ability of the user to visually process the multiple AR elements. In particular, the augmented reality system 110 can render one or more AR elements within a viewing area (that are predicted to be perceivable by the user) and also disable the rendering of one or more other AR elements within the same viewing area (that are predicted to not be perceivable by the user). Indeed, the augmented reality system 110 can selectively render any combination of AR elements based on predicted changes in abilities of a user to visually process one or more AR elements in accordance with one or more embodiments herein.

As previously mentioned, the augmented reality system 110 can selectively render an AR element based on various predictions. In particular, as discussed above, the augmented reality system 110 can utilize eye tracking information (with a machine learning model) to predict various changes in an ability of a user to visually process an AR element. Moreover, the augmented reality system 110 can selectively render an AR element based on such predictions. For example, FIGS. 9A-9G illustrate various examples of the augmented reality system 110 selectively rendering an AR element based on a predicted change in an ability of a user to visually process an AR element.

Figure 9A:
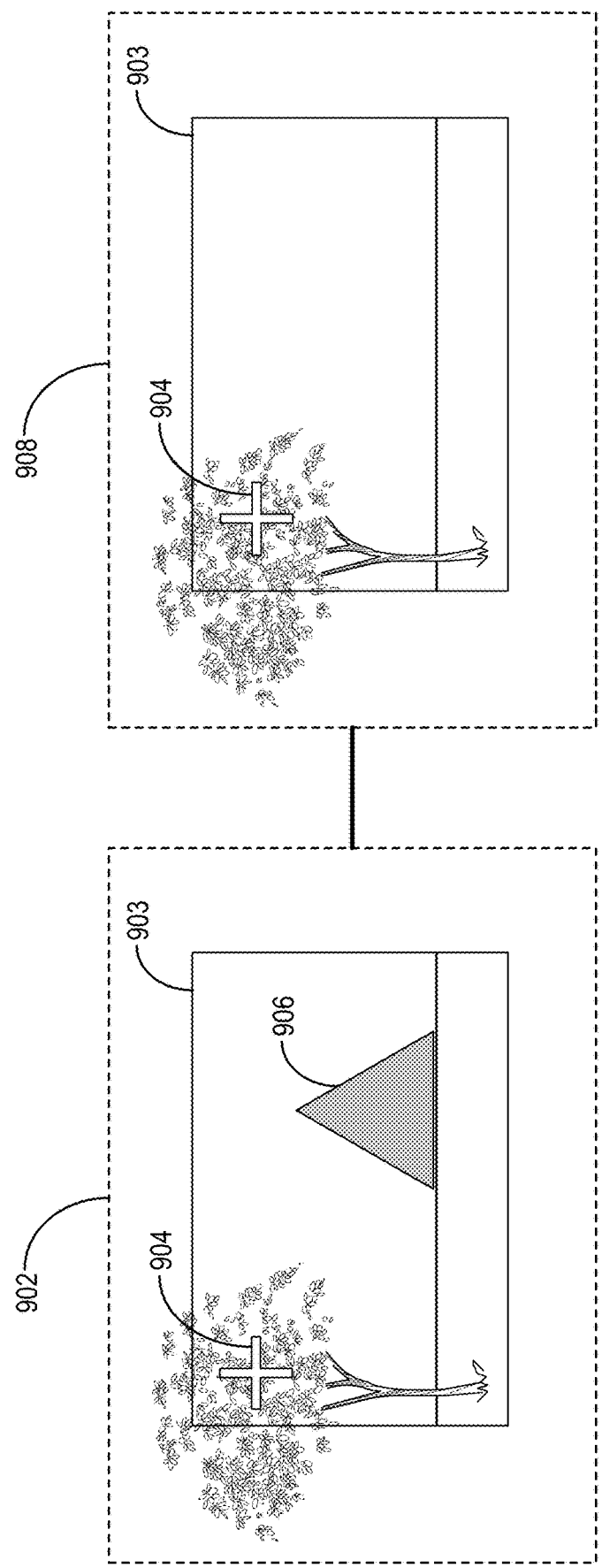
FIGS. 9A-9G illustrate an augmented reality system selectively rendering an augmented reality element in accordance with one or more embodiments.

For instance, FIG. 9A illustrates the augmented reality system 110 terminating rendering of an AR element based on predicting that a user will be unable to visually process the AR element. In particular, as shown in FIG. 9A (in instance 902), the augmented reality system 110 can receive a prediction that the focal point, gazing direction, and/or viewpoint of the user's eyes (e.g., eye target 904) will be away from an AR element 906 in the rendering area 903 of an HMD. Moreover, based on the prediction, the augmented reality system 110 can determine (or predict) that the user will be unable to visually process the AR element 906 (during travel to and/or upon reaching the predicted final eye movement). Furthermore, as illustrated in FIG. 9A (in instance 908), the augmented reality system 110 can disable the rendering of the AR element (e.g., the AR element 906 of instance 902) within the rendering area 903 of the HMD.

Figure 9B:
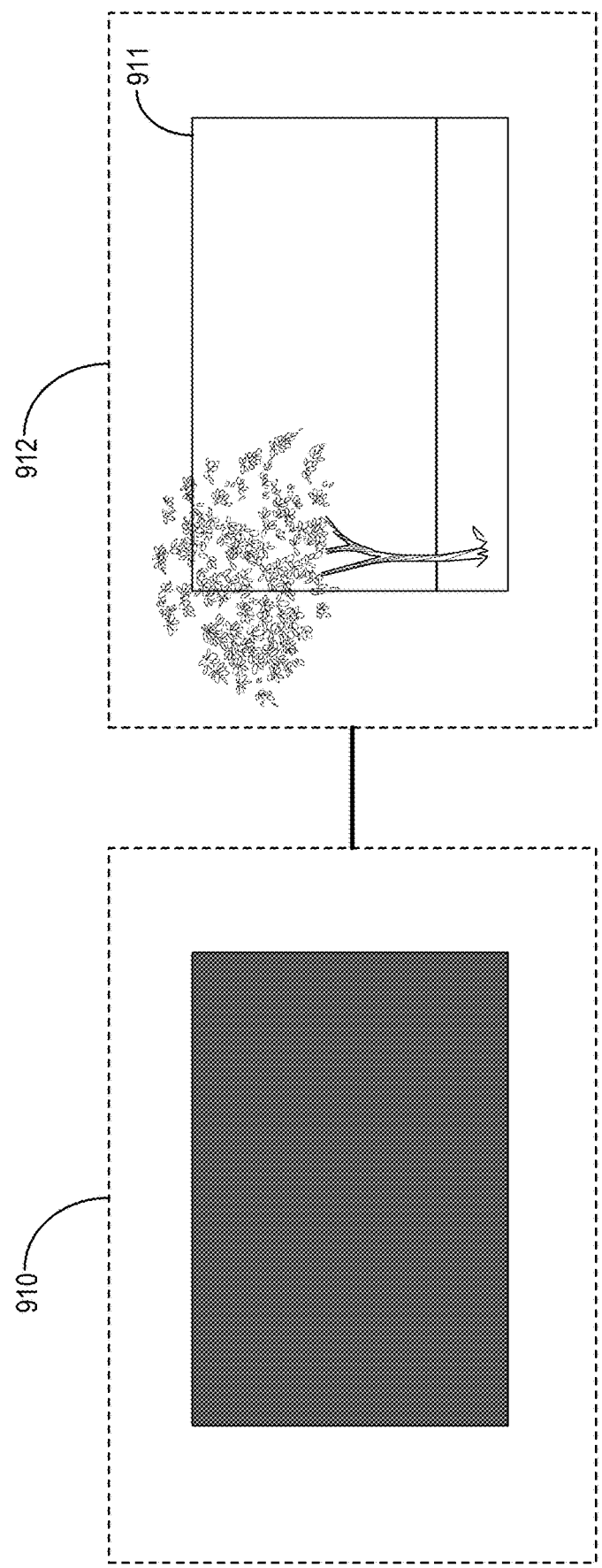

Additionally, FIG. 9B illustrates the augmented reality system 110 terminating rendering of an AR element based on predicting that a user will be unable to visually process the AR element during a blink. In particular, as shown in FIG. 9B (in instance 910), the augmented reality system 110 can receive a prediction that will be blinking (e.g., the user will have no vision for a duration of time). Moreover, based on the prediction, the augmented reality system 110 can determine (or predict) that the user will be unable to visually process an AR element. Consequently, as illustrated in FIG. 9B (in instance 912), the augmented reality system 110 can disable the rendering of any AR element within the rendering area 911 of the HMD (e.g., during the predicted duration of the blink).

Figure 9C:
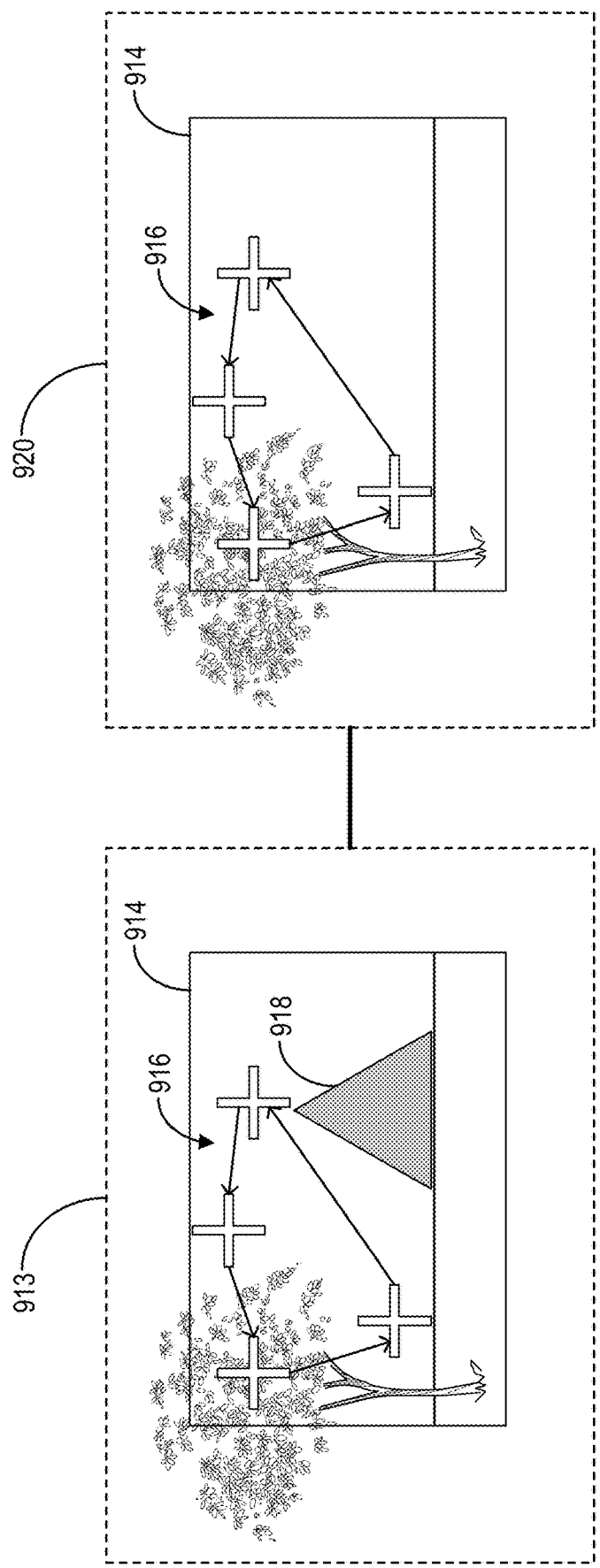

Furthermore, FIG. 9C illustrates the augmented reality system 110 terminating rendering of an AR element based on predicting that a user will be unable to visually process the AR element during a predicted saccade movement of a user's eyes. In particular, as shown in FIG. 9C (in instance 913), the augmented reality system 110 can receive a prediction that the user's eyes will experience a saccade movement 916 in the rendering area 914 of an HMD. In addition, based on the prediction, the augmented reality system 110 can determine (or predict) that the user will be unable to visually process an AR element 918 in the rendering area 914 during the saccade movement 916. Moreover, as illustrated in FIG. 9C (in instance 920), the augmented reality system 110 can disable the rendering of the AR element (e.g., the AR element 918 of instance 913) within the rendering area 914 of the HMD during the saccade movement 916 (e.g., during at least a partial duration of the saccade movement).

Figure 9D:
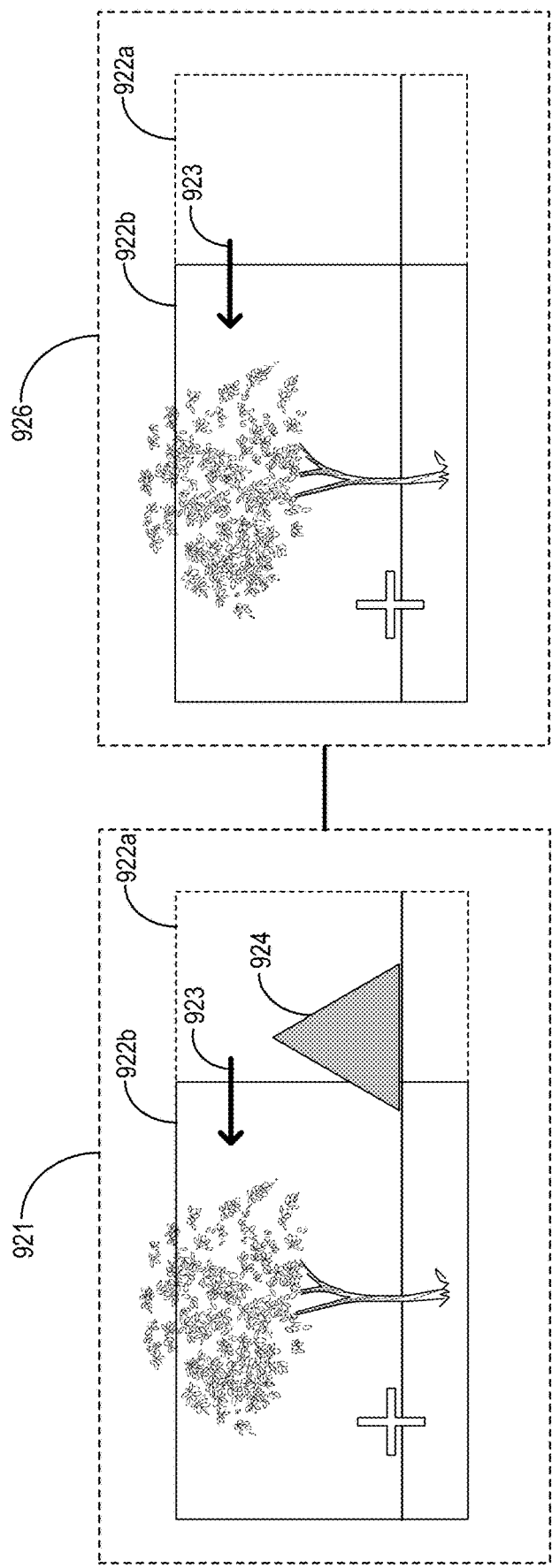

Additionally, FIG. 9D illustrates the augmented reality system 110 terminating rendering of an AR element based on predicting that a user will be unable to visually process the AR element due to a predicted change in a field of view. In particular, as shown in FIG. 9D (in instance 921), the augmented reality system 110 can receive a prediction that the user's field of view will change (e.g., movement 923) from an original viewing area 922a to a new viewing area 922b (associated with a rendering area of an HMD). In addition, based on the prediction, the augmented reality system 110 can determine (or predict) that the user will be unable to visually process an AR element 924 in the new viewing area 922b. Furthermore, as illustrated in FIG. 9D (in instance 926), the augmented reality system 110 can disable the rendering of the AR element (e.g., the AR element 924 of instance 921) within the original viewing area 922a of the HMD while the rendering area is within the new viewing area 922b.

Figure 9E:
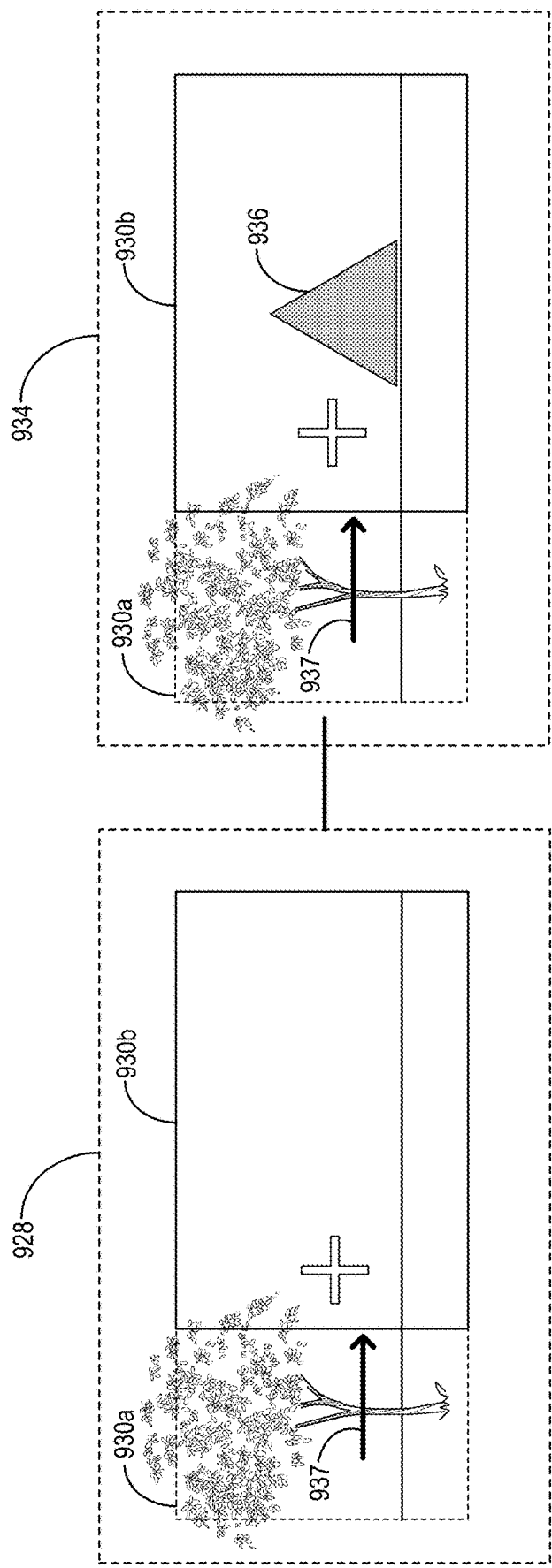

Moreover, FIG. 9E illustrates the augmented reality system 110 rendering an AR element based on predicting that a user will become able to visually process the AR element due to a predicted change in a field of view. In particular, as shown in FIG. 9E (in instance 928), the augmented reality system 110 can receive a prediction that the user's field of view will change (e.g., movement 937) from an original viewing area 930a to a new viewing area 930b (associated with a rendering area of an HMD). Additionally, based on the prediction, the augmented reality system 110 can determine (or predict) that the user will become able to visually process an AR element that belongs in the new viewing area 930b (e.g., the AR element will enter a rendering area associated with the new viewing area 930b). Consequently, as illustrated in FIG. 9E (in instance 934), the augmented reality system 110 can render an AR element 936 within the new viewing area 930b of the HMD while the rendering area is within the new viewing area 930b.

Figure 9F:
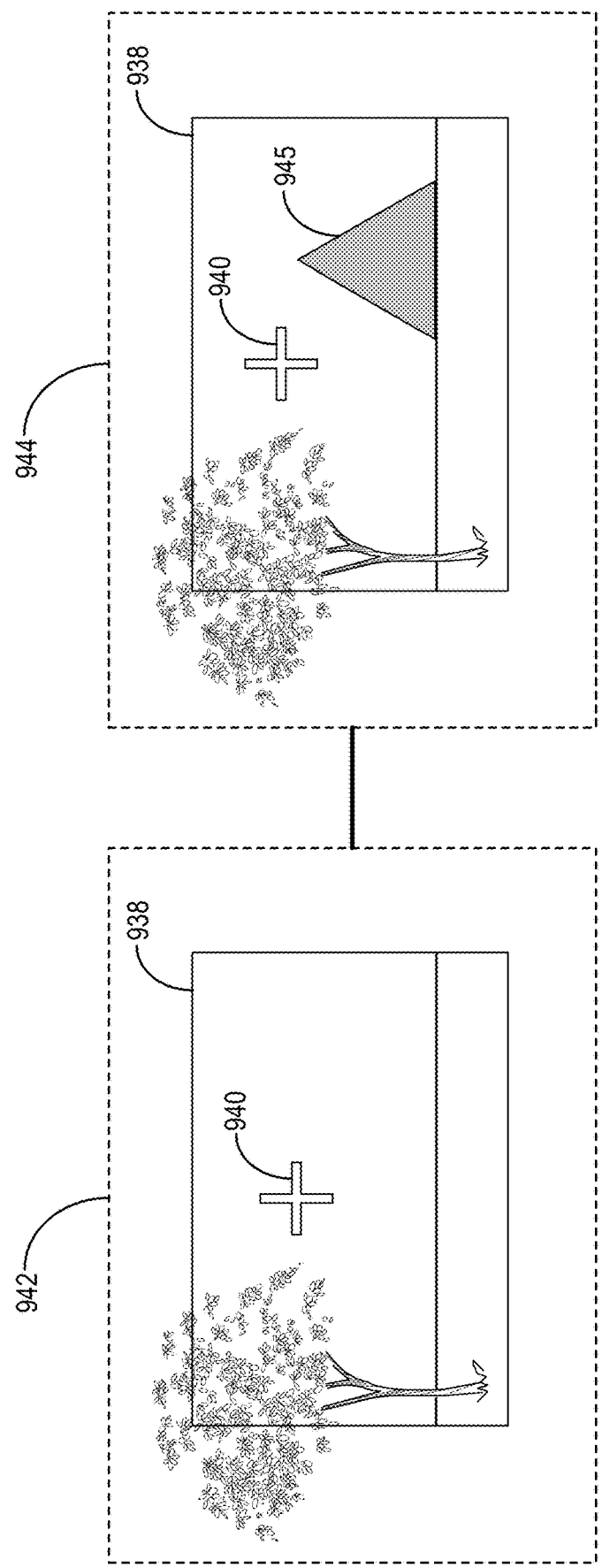

In addition, FIG. 9F illustrates the augmented reality system 110 rendering an AR element based on predicting that a user will become able to visually process the AR element. In particular, as shown in FIG. 9F (in instance 942), the augmented reality system 110 can receive a prediction that the focal point, gazing direction, and/or viewpoint of the user's eyes (e.g., eye target 940) will be near a position associated with an AR element in the rendering area 938 of an HMD. Furthermore, based on the prediction, the augmented reality system 110 can determine (or predict) that the user will become able to visually process the AR element within the rendering area 938. As a result, in reference to FIG. 9F (in instance 944), the augmented reality system 110 can render an AR element 945 within the rendering area 938 of the HMD.

Figure 9G:
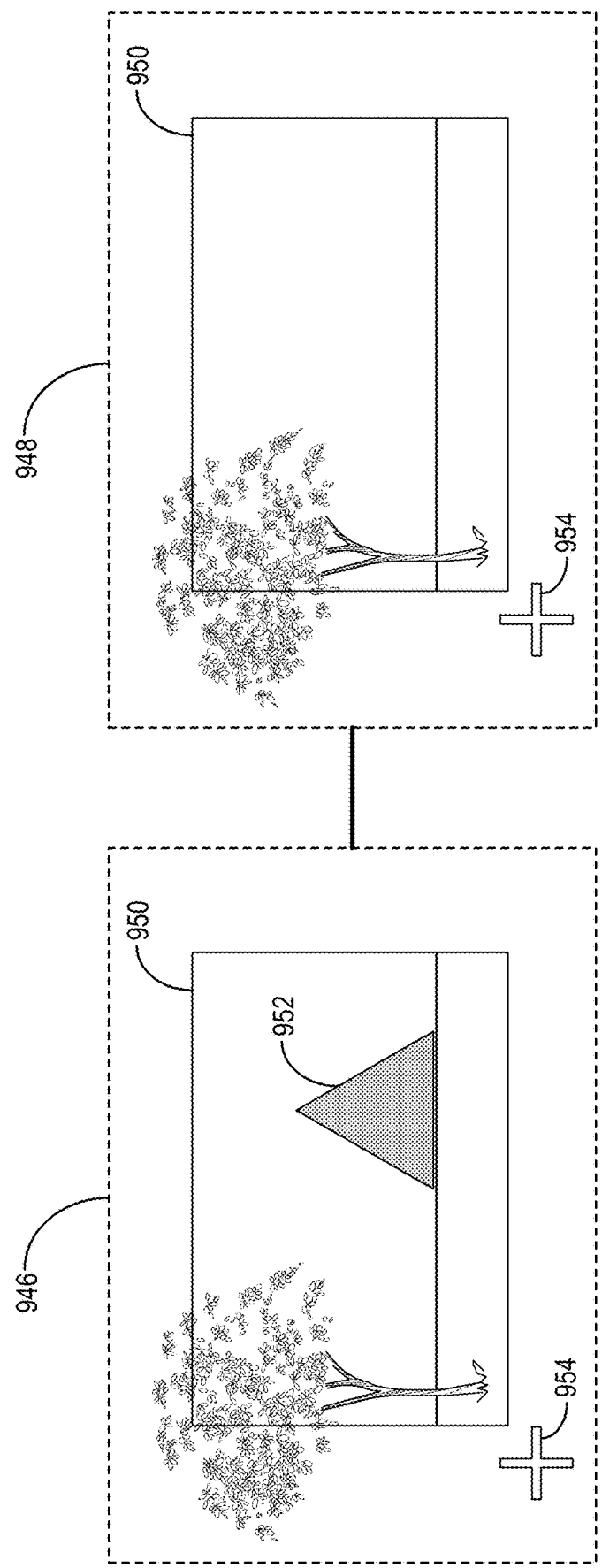

Furthermore, FIG. 9G illustrates the augmented reality system 110 terminating rendering of an AR element based on predicting that a user will be unable to visually process the AR element due to predicting that a focal point, gazing direction, and/or viewpoint of the user's eyes will be outside a rendering area. In particular, as shown in FIG. 9G (in instance 946), the augmented reality system 110 can receive a prediction that the final eye movement (e.g., eye target 954) will be outside of a rendering area 950 of an HMD that displays AR element 952. Based on the prediction, the augmented reality system 110 can determine (or predict) that the user will be unable to visually process the AR element 952. Additionally, as illustrated in FIG. 9G (in instance 948), the augmented reality system 110 can disable the rendering of the AR element (e.g., the AR element 952 of instance 946) within the rendering area 950 of the HMD.

Figure 10:
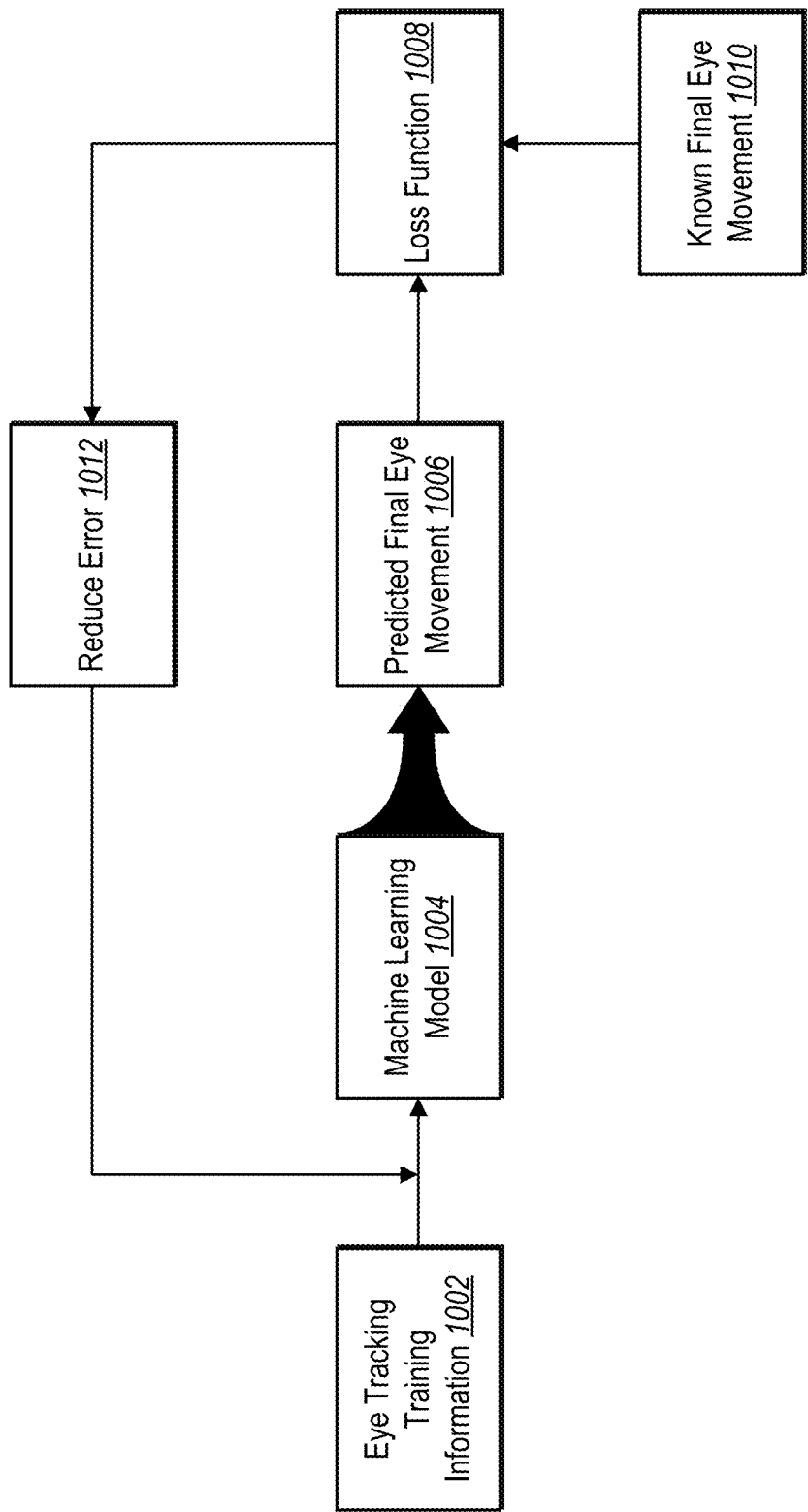
FIG. 10 illustrates an augmented reality system training a machine learning model to predict a change in an ability of a user to visually process an augmented reality element in accordance with one or more embodiments.

As previously mentioned, the augmented reality system 110 can utilize a machine learning model to predict a change in an ability of a user to visually process an AR element and/or predict a final eye movement at a future time based on eye tracking information from an initial time. For instance, FIG. 10 illustrates the augmented reality system 110 training a machine learning model to predict a change in an ability of a user to visually process an AR element and/or predict a final eye movement in accordance with one or more embodiments herein. As mentioned above, the augmented reality system 110 can utilize (and/or train) a neural network based machine learning model such as, but not limited to, a recurrent neural network ("RNN"), a deep neural network ("DNN"), and/or a convolutional neural network ("CNN").

For example, as shown in FIG. 10, the augmented reality system 110 can utilize eye tracking training information 1002 to train a machine learning model 1004. In particular, the augmented reality system 110 can obtain the eye tracking training information 1002 in a variety of approaches. For instance, the augmented reality system 110 can create the eye tracking training information 1002, can receive the eye tracking training information 1002 from a tracking module (e.g., a module that tracks eye tracking information), and/or can obtain the eye tracking training information 1002 from a third party provider.

Furthermore, the eye tracking training information 1002 includes a variety of eye tracking information (e.g., as described above). In particular, the eye tracking training information 1002 includes eye tracking information (e.g., as described above) with a corresponding end result of the tracked eye tracking information (e.g., final eye movement and/or ability of a user to visually process an object) as ground truth data. For instance, the eye tracking training information 1002 can be tracked (or recorded) eye tracking information for a range of time. In some embodiments, the augmented reality system 110 can utilize eye tracking training information 1002 that is labelled (e.g., with a resulting action) as ground truth data.

As illustrated in FIG. 10, the augmented reality system 110 can train the machine learning model 1004 utilizing the eye tracking training information 1002. For instance, the augmented reality system 110 can input the eye tracking training information 1002 into the machine learning model 1004 (without the associated ground truth data). Moreover, the machine learning model 1004 can evaluate (or analyze) the eye tracking training information 1002 to predict a final eye movement 1006 (and/or a predicted change in a user's ability to visually process objects at a specific location). Then, the augmented reality system 110 can utilize a loss function 1008 to compare the predicted final eye movement 1006 to a known final eye movement 1010 (e.g., ground truth data). Furthermore, based on the comparison information from the loss function 1008, the augmented reality system 110 can modify one or more parameters of the machine learning model 1004 (e.g., perform an act 1012 to reduce error of the machine learning model 1004). Moreover, the augmented reality system 110 can iteratively utilize the machine learning model 1004 and comparing predictions with the ground truth data with the loss function 1008 to train the machine learning model 1004.

In one or more embodiments, the augmented reality system 110 utilizes one or more generalized model to predict a change in an ability of a user to visually process an AR element at a future time. For instance, the augmented reality system 110 can utilize statistical models that represent actions corresponding to eye tracking information (e.g., statistics on an amount of time it takes for a user to visually perceive an object in on one or more scenarios described above, blinking frequencies, blinking durations, saccade movement frequencies, saccade movement durations, etc.) to predict a change in an ability of a user to visually process an AR element at a future time. In some embodiments, the augmented reality system 110 utilizes such generalized models in combination with a machine learning model (as described above) to predict a change in an ability of a user to visually process an AR element at a future time.

As previously mentioned, by selectively rendering an AR element based on a predicted change in an ability of a user to visually process, the augmented reality system can reduce power consumption and/or heat generation on the head mounted display while the user cannot visually process the AR element. For instance, as an estimation, a user can blink approximately 1200 times per hour and each blink can have a duration between a 150 to 400 milliseconds. Consequently, a user can spend approximately a 180 to 576 seconds per hour blinking. By predicting when a user blinks and disabling a display of an AR element during a duration of the blink in accordance with one or more embodiments herein, the augmented reality system 110 can reduce the rendering of an AR element for approximately twenty four minutes for every eight hours a user utilizes an HMD (and/or other head mounted display) and, therefore, reduce power consumption and/or heat generation during that time. Likewise, the augmented reality system 110 can reduce the amount of time in which an AR element is rendered for other predicted changes in an ability of a user to visually process AR elements in accordance with one or more embodiments.

Figure 11:
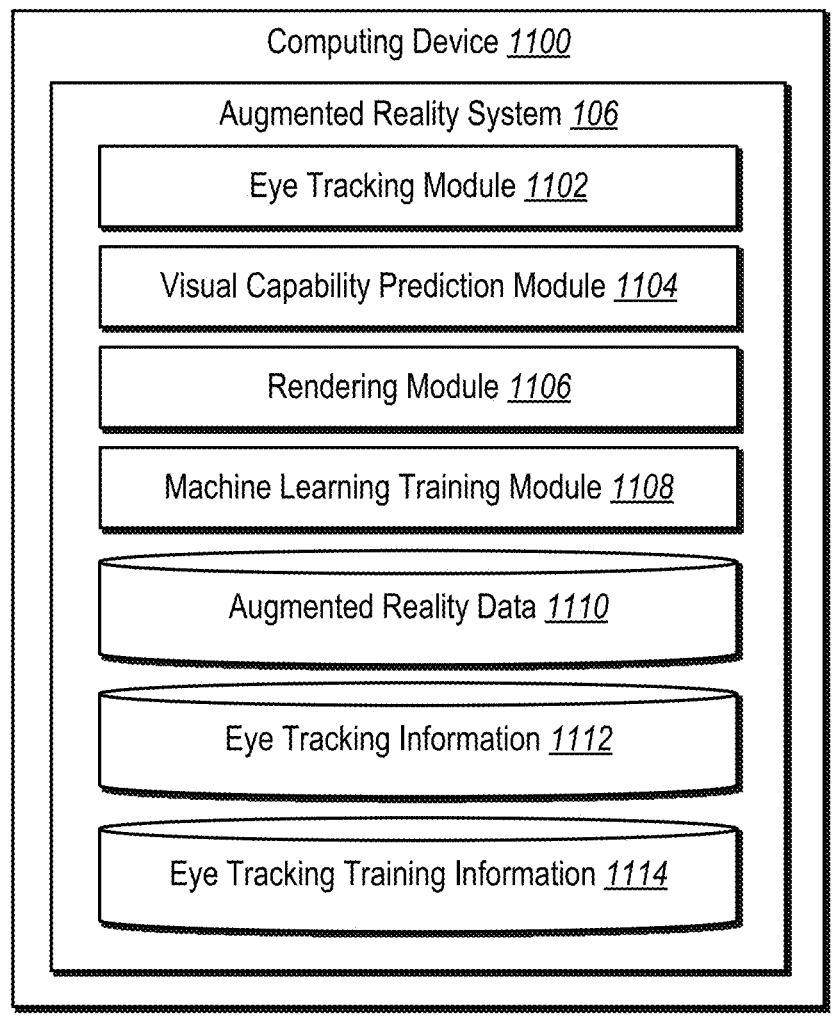
FIG. 11 illustrates a schematic diagram of an augmented reality system 110 in accordance with one or more embodiments herein.

Turning now to FIG. 11, additional detail will be provided regarding components and capabilities of one embodiment of an augmented reality system. In particular, FIG. 11 illustrates an embodiment of an example augmented reality system 110 executed by a computing device 1100 (e.g., the server device(s) 102, the mobile processing device 108, the HMD 114, and/or another head mounted display). As shown by the embodiment in FIG. 11, the computing device 1100 can include and/or host the augmented reality system 110. In some embodiments, the computing device 1100 also includes and/or hosts the digital graphics system 104. Furthermore, as shown in FIG. 11, the augmented reality system 110 can include an eye tracking module 1102, a visual capability prediction module 1104, a rendering module 1106, and a machine learning training module 1108. Moreover, as illustrated in FIG. 11, the augmented reality system 110 can include storage modules for augmented reality data 1110, eye tracking information 1112, and eye tracking training information 1114.

As mentioned above, and as illustrated in the embodiment of FIG. 11, the augmented reality system 110 can include the eye tracking module 1102. For instance, the eye tracking module 1102 can identify, track, capture, and/or record eye tracking information as described above (e.g., in relation to FIGS. 4A and 4B). Additionally, the eye tracking module 1102 can include one or more cameras, sensors, and/or other components to identify, track, capture, and/or record eye tracking information as described above (e.g., in relations to FIGS. 2, 4A, and 4B).

Furthermore, as shown in FIG. 11, the augmented reality system 110 can include the visual capability prediction module 1104. For example, the visual capability prediction module 1104 can identify, predict, and/or determine a final eye movement and/or a change in an ability of a user to visually process objects at a given location at a future time based on eye tracking information as described above (e.g., in relation to FIG. 5). Furthermore, the visual capability prediction module 1104 can utilize, include, and/or configure a machine learning model to predict visual capabilities of a user at a future time as described above (e.g., in relation to FIGS. 5 and 10).

Additionally, as illustrated in FIG. 11, the augmented reality system 110 can include the rendering module 1106. For instance, the rendering module 1106 can display, operate, manage, toggle, and/or process one or more AR elements and/or a graphics pipeline based on visual capability predictions as described above (e.g., in relation to FIGS. 6-9). Additionally, the rendering module 1106 can operate, manage, and/or process one or more processes corresponding to one or more sensors as described above (e.g., in relation to FIGS. 6-9).

Moreover, as shown in FIG. 11, the augmented reality system 110 can include the machine learning training module 1108. For example, the machine learning training module 1108 can utilize, include, train, configure, and/or tune a machine learning model to predict visual capabilities of a user at a future time based on eye tracking information as described above (e.g., in relation to FIG. 10). Moreover, the machine learning training module 1108 can utilize, include, evaluate eye tracking training information as described above (e.g., in relation to FIG. 10).

Furthermore, as illustrated in FIG. 11, the augmented reality system 110 can include one or more storage modules. In particular, the one or more storage modules can maintain data to perform the one or more functions of the augmented reality system 110. As illustrated in FIG. 11, the augmented reality system 110 can include a storage module for augmented reality data 1110 (e.g., visual content, graphics based data, physics based data, and/or location based data for one or more AR elements). Additionally, as shown in FIG. 11, the augmented reality system 110 can include a storage module for eye tracking information 1112 (e.g., tracked data for eye movement, eyelid movement, head movement, and/or body movement of a user). Moreover, as illustrated in FIG. 11, the augmented reality system 110 can include a storage module for eye tracking training information 1114 (e.g., labelled eye tracking information).

Each of the modules (or components) 1102-1114 of the augmented reality system 110 can include software, hardware, or both. For example, the components 1102-1114 can include one or more instructions stored on a computer-readable storage medium and executable by processors of one or more computing devices, such as a mobile processing device or server device. When executed by the one or more processors, the computer-executable instructions of the augmented reality system 110 can cause the computing device(s) to perform the methods described herein. Alternatively, the components 1102-1114 can include hardware, such as a special-purpose processing device to perform a certain function or group of functions. Alternatively, the components 1102-1114 of the augmented reality system 110 can include a combination of computer-executable instructions and hardware.

Furthermore, the components 1102-1114 of the augmented reality system 110 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1114 may be implemented as a stand-alone application, such as a desktop or mobile application. Furthermore, the components 1102—may be implemented as one or more web-based applications hosted on a remote server. The components 1102-1114 may also be implemented in a suite of mobile device applications or "apps."

Figure 12:
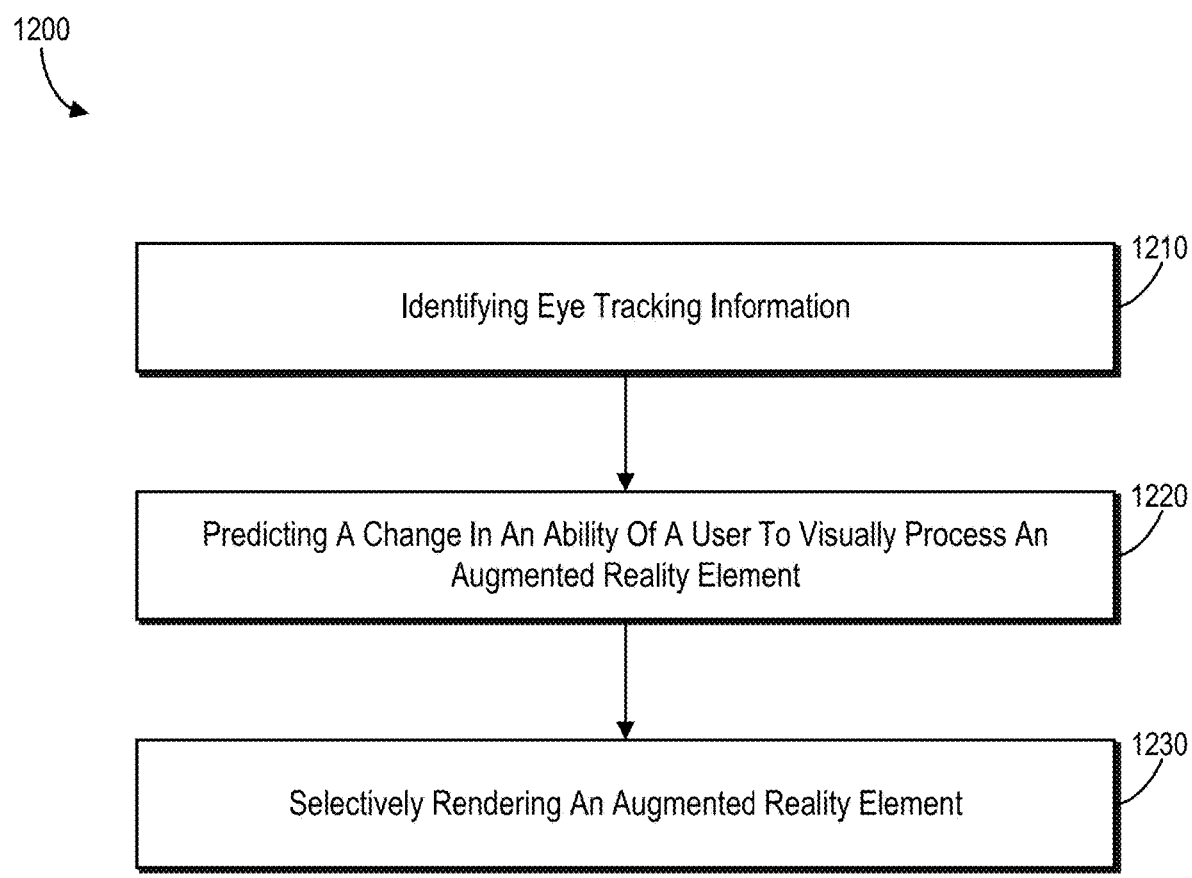
FIG. 12 illustrates a flowchart of a series of acts for selectively rendering an augmented reality element based on a prediction of a change in an ability of a user to visually process the augmented reality element in accordance with one or more embodiments.

FIGS. 1-11, the corresponding text, and the examples provide a number of different methods, systems, devices, and non-transitory computer-readable media of the augmented reality system 110. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for selectively rendering an augmented reality element based on a prediction of a change in an ability of a user to visually process the augmented reality element in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As illustrated in FIG. 12, the series of acts 1200 includes an act 1210 of identifying eye tracking information. In particular, the act 1210 can include identifying, by an augmented reality system that includes a head mounted display, eye tracking information for a user at an initial time. For example, eye tracking information for a user can include eye movement, head movement, or eyelid movement. Moreover, the act 1210 can include identifying eye tracking information by detecting at least one of an eye movement vector, a blink, or a saccade movement. Additionally, the act 1210 can include identifying eye tracking information by utilizing one or more sensors associated with a head mounted display to detect the eye tracking information for a user at an initial time.

As illustrated in FIG. 12, the series of acts 1200 includes an act 1220 of predicting a change in an ability of a user to visually process an augmented reality element. In particular, the act 1220 can include using a machine learning model and based on eye tracking information for a user at an initial time, predicting a change in an ability of a user to visually process an augmented reality element at a future time. For instance, predicting a change in an ability of a user to visually process an augmented reality element at a future time can include predicting that the user will be unable to visually process the augmented reality element at the future time. Furthermore, predicting that a user will be unable to visually process an augmented reality element at a future time includes predicting that the user will blink. Moreover, predicting that a user will be unable to visually process an augmented reality element at a future time can include detecting a beginning of a saccade.

Additionally, predicting a change in an ability of a user to visually process an augmented reality element at a future time can include predicting that a user will become able to visually process an augmented reality element at the future time. Moreover, predicting that a user will become able to visually process an augmented reality element at a future can include predicting that the augmented reality element will enter a rendering area of a head mounted display. Furthermore, the act 1220 can include a machine learning model that is trained to, based on eye tracking information for a user at an initial time, predict subsequent eye movement of the user.

As illustrated in FIG. 12, the series of acts 1200 includes an act 1230 of selectively rendering an augmented reality element. In particular, the act 1230 can include selectively rendering an augmented reality element at a future time based on a predicted change in an ability of a user to visually process an augmented reality element. For example, selectively rendering an augmented reality element at a future time can include terminating a display of the augmented reality element at the future time based on predicting that a user will be unable to visually process the augmented reality element. Furthermore, selectively rendering an augmented reality element at a future time can include terminating a display of an augmented reality element during at least a partial duration of a blink. Moreover, selectively rendering an augmented reality element at a future time can include terminating a display of an augmented reality element during at least a partial duration of a saccade.

Additionally, selectively rendering an augmented reality element at a future time includes displaying an augmented reality element at a future time based on predicting that a user will become able to visually process the augmented reality element. Furthermore, selectively rendering an augmented reality element at a future time can include initiating a graphics pipeline for the augmented reality element in anticipation of the augmented reality element entering a rendering area of a head mounted display. Moreover, the act 1230 can include selectively rendering an augmented reality element by performing at least one of displaying the augmented reality element, terminating a display of the augmented reality element, reducing a frame rate of the augmented reality element, reducing a resolution of the augmented reality element, calculating a position of the augmented reality element, or terminating the calculation of the position of the augmented reality element.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
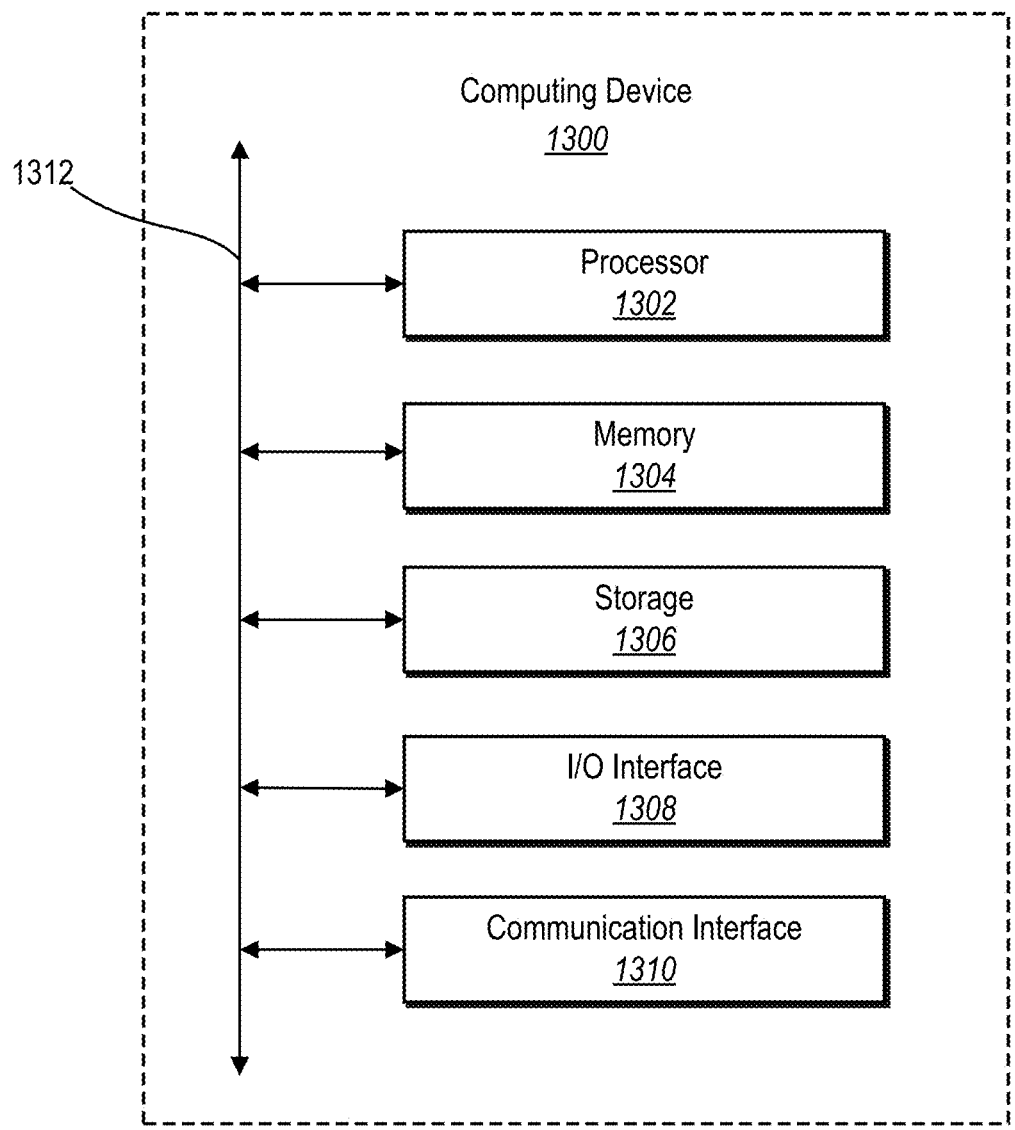
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server device(s) 102, HMD 114, and mobile processing device 108). In one or more embodiments, the computing device 1300 may be a mobile device (e.g., a mobile telephone, a smartphone, a PDA, a tablet, a laptop, a camera, a tracker, a watch, a wearable device, a head mounted display, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Additionally, the augmented reality system can be included in a social networking system. A social networking system may enable its users (such as persons or organizations) to interact with the system and with each other. The social networking system may, with input from a user, create and store in the social networking system a user profile associated with the user. Moreover, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying, by an augmented reality system comprising a head mounted display, eye tracking information for a user at an initial time;
predicting a change in an ability of the user to visually process an augmented reality element at a future time, within a display of the head mounted display, based on a characteristic of the augmented reality element and using a machine learning model to analyze the eye tracking information for the user at the initial time; and
selectively rendering the augmented reality element, within the display of the head mounted display, at the future time based on the predicted change in the ability of the user to visually process the augmented reality element.

2. The computer-implemented method of claim 1, wherein the eye tracking information for the user comprises at least one of eye movement, head movement, or eyelid movement.

3. The computer-implemented method of claim 2, wherein identifying the eye tracking information comprises detecting at least one of an eye movement vector, a blink, or a saccade movement.

4. The computer-implemented method of claim 1,
wherein predicting the change in the ability of the user to visually process the augmented reality element at the future time comprises predicting that the user will be unable to visually process the augmented reality element at the future time; and
wherein selectively rendering the augmented reality element at the future time comprises terminating a display of the augmented reality element at the future time based on predicting that the user will be unable to visually process the augmented reality element.

5. The computer-implemented method of claim 4,
wherein predicting that the user will be unable to visually process the augmented reality element at the future time comprises predicting that the user will blink; and
wherein selectively rendering the augmented reality element at the future time comprises terminating the display of the augmented reality element during at least a partial duration of the predicted blink.

6. The computer-implemented method of claim 4,
wherein predicting that the user will be unable to visually process the augmented reality element at the future time comprises predicting a beginning of a saccade; and
wherein selectively rendering the augmented reality element at the future time comprises terminating the display of the augmented reality element during at least a partial duration of the predicted saccade.

7. The computer-implemented method of claim 1,
wherein predicting the change in the ability of the user to visually process the augmented reality element at the future time comprises predicting that the user will become able to visually process the augmented reality element at the future time; and
wherein selectively rendering the augmented reality element at the future time comprises displaying the augmented reality element at the future time based on predicting that the user will become able to visually process the augmented reality.

8. The computer-implemented method of claim 7,
wherein predicting that the user will become able to visually process the augmented reality element at the future time comprises predicting that the augmented reality element will enter a rendering area of the head mounted display, and
wherein selectively rendering the augmented reality element at the future time comprises initiating a graphics pipeline for the augmented reality element in anticipation of the augmented reality element entering the rendering area of the head mounted display.

9. The computer-implemented method of claim 1, further comprising predicting the change in the ability of the user to visually process the augmented reality element at the future time using the machine learning model to analyze the eye tracking information for the user at the initial time and user characteristics of the user.

10. The computer-implemented method of claim 1, wherein selectively rendering the augmented reality element comprises at least one of:
displaying the augmented reality element;
terminating a display of the augmented reality element;
reducing a frame rate of the augmented reality element;
reducing a resolution of the augmented reality element;
calculating a position of the augmented reality element; or
terminating the calculation of the position of the augmented reality element.

11. The computer-implemented method of claim 1, wherein the machine learning model is trained to, based on the eye tracking information for the user at the initial time, predict subsequent eye movement of the user.

12. An augmented reality system comprising:
at least one head mounted display;
at least one processor; and
at least one non-transitory computer-readable storage medium storing instructions that, when executed by the at least one processor, cause the augmented reality system to:
identify eye tracking information for a user at an initial time;
predict a change in an ability of the user to visually process an augmented reality element at a future time, within a display of the head mounted display, based on a characteristic of the augmented reality element and using a machine learning model to analyze the eye tracking information for the user at the initial time; and
selectively render the augmented reality element, within the display of the head mounted display, at the future time based on the predicted change in the ability of the user to visually process the augmented reality element.

13. The augmented reality system of claim 12, wherein the eye tracking information for the user comprises at least one of eye movement, head movement, or eyelid movement.

14. The augmented reality system of claim 12,
wherein predicting the change in the ability of the user to visually process the augmented reality element at the future time comprises predicting that the user will be unable to visually process the augmented reality element at the future time; and wherein selectively rendering the augmented reality element at the future time comprises terminating a display of the augmented reality element at the future time based on predicting that the user will be unable to visually process the augmented reality element.

15. The augmented reality system of claim 14, wherein predicting that the user will be unable to visually process the augmented reality element at the future time comprises predicting that the user will blink; and wherein selectively rendering the augmented reality element at the future time comprises terminating the display of the augmented reality element during at least a partial duration of the predicted blink.

16. The augmented reality system of claim 12, wherein predicting the change in the ability of the user to visually process the augmented reality element at the future time comprises predicting that the user will become able to visually process the augmented reality element at the future time; and wherein selectively rendering the augmented reality element at the future time comprises displaying the augmented reality element at the future time based on predicting that the user will become able to visually process the augmented reality element.

17. A non-transitory computer-readable medium storing instructions that, when executed by at least one processor, cause a computer system comprising a head mounted display to:

identify eye tracking information for a user at an initial time;

predict a change in an ability of the user to visually process an augmented reality element at a future time, within a display of the head mounted display, based on a characteristic of the augmented reality element and using a machine learning model to analyze the eye tracking information for the user at the initial time; and selectively render the augmented reality element, within the display of the head mounted display, at the future time based on the predicted change in the ability of the user to visually process the augmented reality element.

18. The non-transitory computer-readable medium of claim 17, wherein:

the eye tracking information for the user comprises at least one of eye movement, head movement, or eyelid movement; and the characteristics of the augmented reality element comprise at least a size of the augmented reality element.

19. The non-transitory computer-readable medium of claim 17, wherein predicting the change in the ability of the user to visually process the augmented reality element at the future time comprises predicting that the user will be unable to visually process the augmented reality element at the future time; and wherein selectively rendering the augmented reality element at the future time comprises terminating a display of the augmented reality element at the future time based on predicting that the user will be unable to visually process the augmented reality element.

20. The non-transitory computer-readable medium of claim 17, wherein predicting the change in the ability of the user to visually process the augmented reality element at the future time comprises predicting that the user will become able to visually process the augmented reality element at the future time; and wherein selectively rendering the augmented reality element at the future time comprises displaying the augmented reality element at the future time based on predicting that the user will become able to visually process the augmented reality element.

* * * * *